US011936909B2

(12) United States Patent
Zhang et al.

(10) Patent No.: US 11,936,909 B2
(45) Date of Patent: Mar. 19, 2024

(54) PREDICTION METHOD, ENCODER, DECODER, AND COMPUTER STORAGE MEDIUM

(71) Applicant: GUANGDONG OPPO MOBILE TELECOMMUNICATIONS CORP., LTD., Guangdong (CN)

(72) Inventors: Wei Zhang, Guangdong (CN); Fuzheng Yang, Guangdong (CN); Shuai Wan, Guangdong (CN); Junyan Huo, Guangdong (CN); Yanzhuo Ma, Guangdong (CN); Lihui Yang, Guangdong (CN); Na Dai, Guangdong (CN); Sujun Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 182 days.

(21) Appl. No.: 17/655,353

(22) Filed: Mar. 17, 2022

(65) Prior Publication Data
US 2022/0210471 A1    Jun. 30, 2022

Related U.S. Application Data

(63) Continuation of application No. PCT/CN2019/109695, filed on Sep. 30, 2019.

(51) Int. Cl.
*H04N 19/597* (2014.01)
*H04N 19/119* (2014.01)
(Continued)

(52) U.S. Cl.
CPC ......... *H04N 19/597* (2014.11); *H04N 19/119* (2014.11); *H04N 19/124* (2014.11); *H04N 19/176* (2014.11); *H04N 19/186* (2014.11)

(58) Field of Classification Search
CPC .. H04N 19/597; H04N 19/119; H04N 19/124; H04N 19/176; H04N 19/186;
(Continued)

(56) References Cited

FOREIGN PATENT DOCUMENTS

| CN | 109257604 A | 1/2019 |
|----|-------------|--------|
| CN | 108632621 B | 7/2019 |

(Continued)

OTHER PUBLICATIONS

Cohen, R.A., et al., "Point Cloud Attribute Compression using 3-D Intra Prediction and Shape-Adaptive Transforms," 2016 Data Compression Conference (DCC), Apr. 1, 2016 (Apr. 1, 2016) (10 pages).

(Continued)

*Primary Examiner* — Howard D Brown, Jr.
*Assistant Examiner* — Tyler B Edwards
(74) *Attorney, Agent, or Firm* — PERKINS COIE LLP

(57) ABSTRACT

A prediction method, an encoder, a decoder, and a computer storage medium are provided. The prediction method applied to an encoder includes: determining a spatial block in which an encoding point is located; constructing a prediction model according to the spatial block; acquiring a value of a first colour component and a value of a second colour component of the encoding point; obtaining a prediction value of the second colour component of the encoding point by using the prediction model and the value of the first colour component; calculating a difference between the value of the second colour component and the prediction value of the second colour component, and using the obtained difference as a residual of the encoding point; and performing Level of Detail (LOD) partitioning and lifting transform based on the residual of the encoding point.

20 Claims, 9 Drawing Sheets

(51) Int. Cl.
   *H04N 19/124* (2014.01)
   *H04N 19/176* (2014.01)
   *H04N 19/186* (2014.01)

(58) Field of Classification Search
   CPC .. H04N 19/136; H04N 19/129; H04N 19/593; G06T 9/001; G06T 9/004
   See application file for complete search history.

(56) References Cited

FOREIGN PATENT DOCUMENTS

| CN | 108322742 B | 8/2019 | | |
|---|---|---|---|---|
| WO | 2018191224 A1 | 10/2018 | | |
| WO | WO-2018191224 A1 | * | 10/2018 | ........... H04N 19/105 |
| WO | 2019039324 A1 | 2/2019 | | |
| WO | 2019055772 A1 | 3/2019 | | |
| WO | 2019076503 A1 | 4/2019 | | |

OTHER PUBLICATIONS

International Search Report dated Jun. 30, 2020 of PCT/CN2019/109695 (6 pages).

Mammou. Khaled et al. "G-PCC codec description v2"—International Organisation for Standardisation Organisation Internationale de Normalisation ISO/IEC JTCJ/SC29/WGJ 1 Coding of Moving Pictures and Audio NI8189, Jan. 31, 2019 (Jan. 31, 2019) (39 pages).

International Organisation for Standardisation Organisation Internationale De Normalisation ISO/IEC JTC1/SC29/WG11 Coding of Moving Pictures and Audio—ISO/IEC JTC1/SC29/WG11 MPEG2018/m43781 Jul. 2018, Ljubjana, Slovenia—Apple Inc., Efficient implementation of the Lifting Scheme in TMC13 (108 pages).

3DG "G-PCC codec description v2" ISO/IEC JTC1/SC29/WG11 N18189; Jan. 2019; Marrakech, MA. 39 pages.

Extended European Search Report for European Application No. 19947496.6 dated Sep. 15, 2022. 10 pages.

Tencent America LLC. "Inter-Channel Prediction for Attribute Coding" ISO/IEC JTC1/SC29/WG11 MPEG2019/m49605; Jul. 2019; Gothenburg, SE. 5 pages.

Zhang, K. et al. "Enhanced Cross-Component Linear Model for Chroma Intra-Prediction in Video Coding" IEEE Transactions on Image Processing; vol. 27, No. 8; Aug. 2018. pp. 3983-3997.

First examination report for European Application No. 19947496.6 dated Aug. 16, 2023. 6 pages.

* cited by examiner

PREDICTION METHOD, ENCODER, DECODER, AND COMPUTER STORAGE MEDIUM

CROSS-REFERENCE TO RELATED APPLICATION

The present application is a continuation application of the International PCT Application No. PCT/CN2019/109695, having an international filing date of Sep. 30, 2019, the entire content of which is hereby incorporated by reference.

TECHNICAL FIELD

Embodiments of the present application relate to the field of video encoding and decoding technologies, and more particularly, to a predication method, an encoder, a decoder, and a computer storage medium.

BACKGROUND

In a Geometry-based Point Cloud Compression (G-PCC) encoder framework, geometry information of point clouds and attribute information corresponding to each of the point clouds are encoded separately. After geometry encoding is completed, the geometry information is reconstructed, and the encoding of the attribute information will depend on the reconstructed geometry information.

At present, the encoding of the attribute information mainly aims at encoding of colour information. Firstly, the colour information is converted from a Red-Green-Blue (RGB) colour space to a Luma-Chroma (YUV) colour space. Then, the point clouds are recoloured using the reconstructed geometry information, so that attribute information that is not encoded corresponds to the reconstructed geometry information. In the encoding of the colour information, there are mainly two transform methods, one is distance-based lifting transform which depends on Level of Detail (LOD) partitioning, and the other is Region Adaptive Hierarchal Transform (RAHT) which is directly performed. In the two methods, the colour information will be converted from a spatial domain to a frequency domain, high-frequency and low-frequency coefficients are obtained through transform, and finally the coefficients are quantized and encoded to generate a binary bitstream.

However, before the LOD partitioning, since there is a correlation between three colour components (which may be represented by Y, U, and V respectively), a quantity of encoded bits will be increased during the LOD partitioning and lifting transform, resulting in a poor encoding efficiency.

SUMMARY

Embodiments of the present application provides a prediction method, an encoder, a decoder, and a computer storage medium, such that correlation between three colour components prior to LOD partitioning and lifting transform may be removed and encoding bit overhead may be reduced effectively, thereby improving an encoding and decoding efficiency.

Technical solutions of the embodiments of the present application may be implemented as follows.

In a first aspect, an embodiment of the present application provides a prediction method, which is applied to an encoder and includes: determining a spatial block in which an encoding point is located; constructing a prediction model according to the spatial block, wherein the prediction model is used for characterizing a predicted relationship between a first colour component and a second colour component of the encoding point; acquiring a value of the first colour component and a value of the second colour component of the encoding point; obtaining a prediction value of the second colour component of the encoding point using the prediction model and the value of the first colour component; calculating a difference between the value of the second colour component and the prediction value of the second colour component and using the obtained difference as a residual of the encoding point; and performing Level of Detail (LOD) partitioning and lifting transform based on the residual of the encoding point.

In a second aspect, an embodiment of the present application provides a prediction method, which is applied to a decoder and includes: determining a spatial block in which a decoding point is located; parsing an attribute bitstream to obtain a value of a first colour component and an initial residual of the decoding point, and a first model parameter and a second model parameter corresponding to the spatial block; constructing a prediction model according to the first model parameter and the second model parameter, wherein the prediction model is used for characterizing a predicted relationship between the first colour component and a second colour component of the decoding point; obtaining a prediction value of the second colour component of the decoding point using the prediction model and the value of the first colour component; performing Level of Detail (LOD) partitioning and lifting inverse transform on the initial residual obtained by the parsing to determine a residual of the decoding point; and calculating a reconstructed value of the second colour component of the decoding point based on the residual of the decoding point and the prediction value of the second colour component.

In a third aspect, an embodiment of the present application provides an encoder including a first determining unit, a first constructing unit, a first acquiring unit, a first predicting unit, a first calculating unit, and a transform unit, wherein the first determining unit is configured to determine a spatial block in which an encoding point is located; the first constructing unit is configured to construct a prediction model according to the spatial block, wherein the prediction model is used for characterizing a predicted relationship between a first colour component and a second colour component of the encoding point; the first acquiring unit is configured to acquire a value of the first colour component and a value of the second colour component of the encoding point; the first predicting unit is configured to obtain a prediction value of the second colour component of the encoding point using the prediction model and the value of the first colour component; the first calculating unit is configured to calculate a difference between the value of the second colour component and the prediction value of the second colour component and use the obtained difference as a residual of the encoding point; and the transform unit is configured to perform Level of Detail (LOD) partitioning and lifting transform based on the residual of the encoding point.

In a fourth aspect, an embodiment of the present application provides a decoder including a second determining unit, a parsing unit, a second constructing unit, a second predicting unit, an inverse transform unit, and a second calculating unit, wherein the second determining unit is configured to determine a spatial block in which a decoding point is located; the parsing unit is configured to parse an attribute bitstream to obtain a value of a first colour component and an initial residual of the decoding point, and a first model parameter and a second model parameter corresponding to the spatial block; the second constructing unit is configured to construct a prediction model according to the first model parameter and the second model parameter, wherein the prediction model is used for characterizing a predicted relationship between the first colour component and a second colour component of the decoding point; the second predicting unit is configured to obtain a prediction value of the second colour component of the decoding point using the prediction model and the value of the first colour component; the inverse transform unit is configured to perform Level of Detail (LOD) partitioning and lifting inverse transform on the initial residual obtained by the parsing to determine a residual of the decoding point; and the second calculating unit is configured to calculate a reconstructed value of the second colour component of the decoding point based on the residual of the decoding point and the prediction value of the second colour component.

In a fifth aspect, an embodiment of the present application provides an encoder including a first memory and a first processor, wherein the first memory is configured to store a computer program capable of running on the first processor; and the first processor is configured to perform the method according to the first aspect when the computer program is running.

In a sixth aspect, an embodiment of the present application provides a decoder including a second memory and a second processor, wherein the second memory is configured to store a computer program capable of running on the second processor; and the second processor is configured to perform the method according to the second aspect when the computer program is running.

In a seventh aspect, an embodiment of the present application provides a computer-readable storage medium having stored therein a computer program, wherein when the computer program is executed by a first processor, the method as described in the first aspect is implemented, and when the computer program is executed by a second processor, the method as described in the second aspect is implemented.

The embodiments of the present application provide a prediction method, an encoder, a decoder, and a computer storage medium. The method may be applied to the encoder. By determining a spatial block in which an encoding point is located; constructing a prediction model according to the spatial block, wherein the prediction model is used for characterizing a predicted relationship between a first colour component and a second colour component of the encoding point; then acquiring a value of the first colour component and a value of the second colour component of the encoding point; obtaining a prediction value of the second colour component of the encoding point using the prediction model and the value of the first colour component; finally calculating a difference between the value of the second colour component and the prediction value of the second colour component and using the obtained difference as a residual of the encoding point; and performing Level of Detail (LOD) partitioning and lifting transform based on the residual of the encoding point, thus another colour component may be predicted using one colour component to obtain a prediction value, so as to calculate a predicted residual according to an actual value and the prediction value, such that correlation between colour components may be removed and encoding bit overhead may be reduced effectively, thereby improving an encoding efficiency. This method may also be applied to the decoder. By determining a spatial block in which a decoding point is located; parsing an attribute bitstream to obtain a value of a first colour component and an initial residual of the decoding point, and a first model parameter and a second model parameter corresponding to the spatial block; constructing a prediction model according to the first model parameter and the second model parameter, wherein the prediction model is used for characterizing a predicted relationship between the first colour component and a second colour component of the decoding point; then obtaining a prediction value of the second colour component of the decoding point using the prediction model and the value of the first colour component; finally performing LOD partitioning and lifting inverse transform on the initial residual obtained by the parsing to determine a residual of the decoding point; and calculating a reconstructed value of the second colour component of the decoding point based on the residual of the decoding point and the prediction value of the second colour component, thus another colour component may be predicted using one colour component to obtain a prediction value, so as to reconstruct an attribute value according to the prediction value and a predicted residual obtained by parsing, such that correlation between colour components prior to the LOD partitioning and lifting transform may be removed and encoding bit overhead may be reduced effectively, thereby improving an encoding and decoding efficiency.

DETAILED DESCRIPTION

In order to understand features and technical contents of the embodiments of the present application in more detail, implementations of the embodiments of the present application will be described in detail below in combination with the accompanying drawings, which are used for reference only and are not intended to limit the embodiments of the present application.

In the embodiments of the present application, in a Geometry-based Point Cloud Compression (G-PCC)

encoder framework, after point clouds of an input three-dimensional picture model are partitioned into slices, each of the slices is encoded independently.

Figure 1:
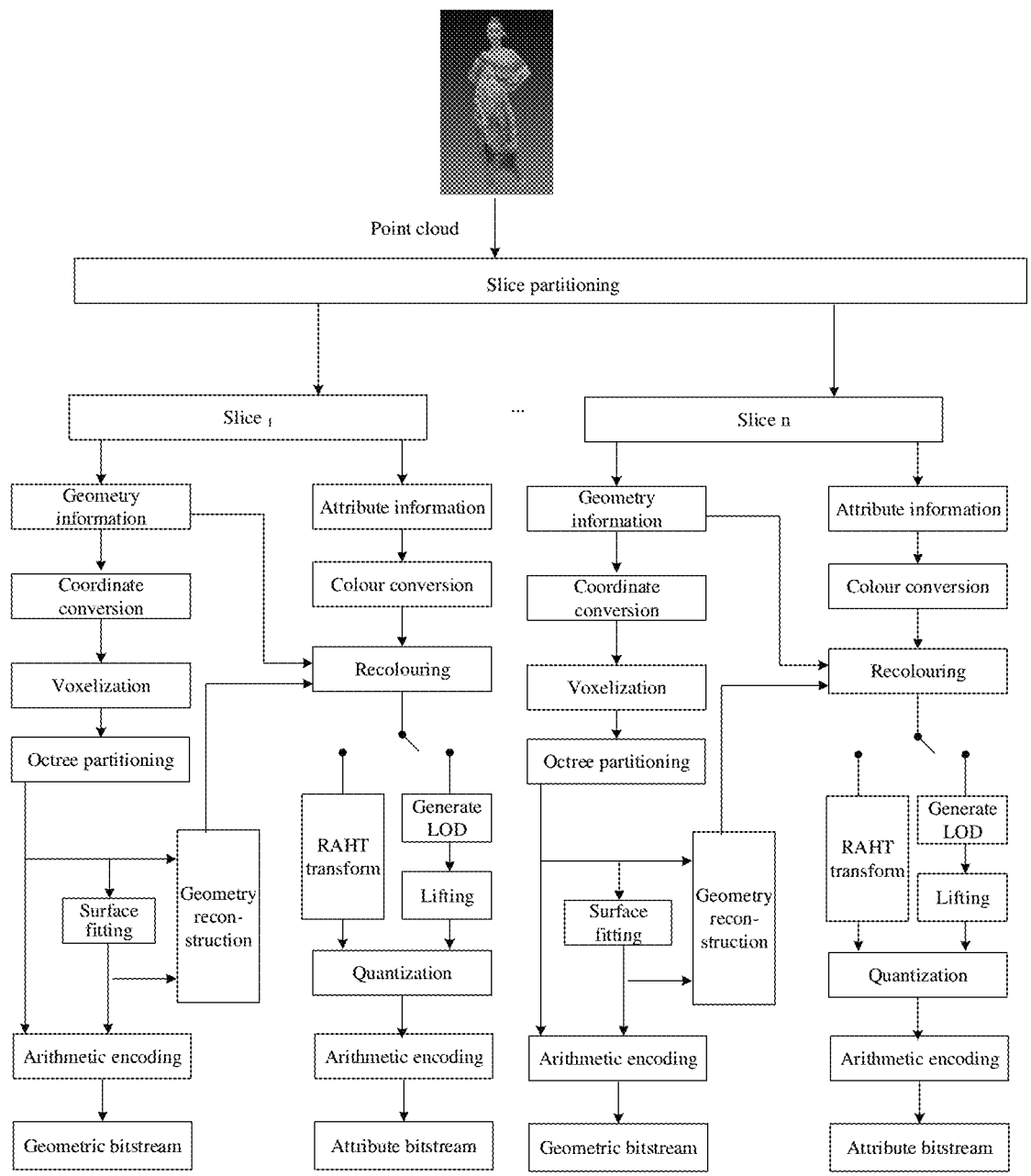
FIG. 1 is a flow block diagram of G-PCC encoding according to a related technical solution.

Referring to FIG. 1, FIG. 1 shows a flow block diagram of G-PCC encoding according to a related technical solution. In the flow block diagram of the G-PCC encoding as shown in FIG. 1, which is applied to a point cloud encoder, point cloud data to be encoded is first partitioned into a plurality of slices through slice partitioning. In each of the slices, geometry information of point clouds and attribute information corresponding to each of the point clouds are encoded separately. In a process of geometry encoding, coordinate conversion is performed on the geometry information, so that all the point clouds are contained in a bounding box, and then quantized. The quantization in this act mainly plays a role in scaling. Since of quantization rounding, geometry information of a portion of the point clouds is the same, then whether duplicate points are removed is determined based on a parameter. A process of quantizing and removing duplicate points is also called a voxelization process. Then, octree partitioning is performed on the bounding box. In an octree-based geometry information encoding process, the bounding box is partitioned into eight equal sub-cubes, and a non-empty sub-cube (containing points in the point clouds) are partitioned into eight equal portions, partitioning is stopped until leaf nodes obtained through partitioning are unit cubes of 1×1×1, then points in the leaf nodes are arithmetically encoded to generate binary geometric bitstreams, i.e., geometric bitstreams. In a triangle soup (trisoup)-based geometry information encoding process, octree partitioning will also be performed first. However, different from the octree-based geometry information encoding process, in the trisoup-based geometry information encoding process, the point clouds do not need to be partitioned step by step into unit cubes of 1×1×1, but partitioned into blocks (sub-blocks) with a side length of W and partitioning is stopped. Based on a surface formed by distribution of the point clouds in each block, at most twelve vertexes generated by the surface and twelve edges of the block are obtained, and the vertexes are arithmetically encoded (to perform surface fitting based on the vertexes) to generate binary geometric bitstreams, i.e., geometric bitstreams. The vertexes are also used for implementation of a process of geometry reconstruction, and reconstructed set information is used during encoding of attributes of the point clouds.

In an attribute encoding process, geometry encoding is completed, and after the geometry information is reconstructed, colour conversion is performed, and colour information (i.e., attribute information) is converted from an RGB colour space to a YUV colour space. Then, the point clouds are recoloured using the reconstructed geometry information, so that attribute information that is not encoded corresponds to the reconstructed geometry information. The attribute encoding is mainly performed on the colour information. In a process of encoding the colour information, there are mainly two transform methods. One transform method is distance-based lifting transform which depends on Level of Detail (LOD) partitioning. At present, LOD partitioning is mainly divided into two ways: LOD partitioning based on distances (mainly for Category1 sequence) and LOD partitioning based on fixed sampling rates (mainly for Category3 sequence). The other transform method is to perform Region Adaptive Hierarchal Transform (RAHT) directly. In the two methods, the colour information will be converted from a spatial domain to a frequency domain, high-frequency and low-frequency coefficients are obtained through transform, and finally the coefficients are quantized (i.e., quantized coefficients). Finally, after slice synthesis is performed on geometry encoding data which is processed through octree partitioning and surface fitting, and attribute encoding data which is processed through the quantized coefficients, vertex coordinates of each block are encoded in turn (i.e., arithmetic encoding) to generate binary attribute bitstreams, i.e., attribute bitstreams.

Figure 2:
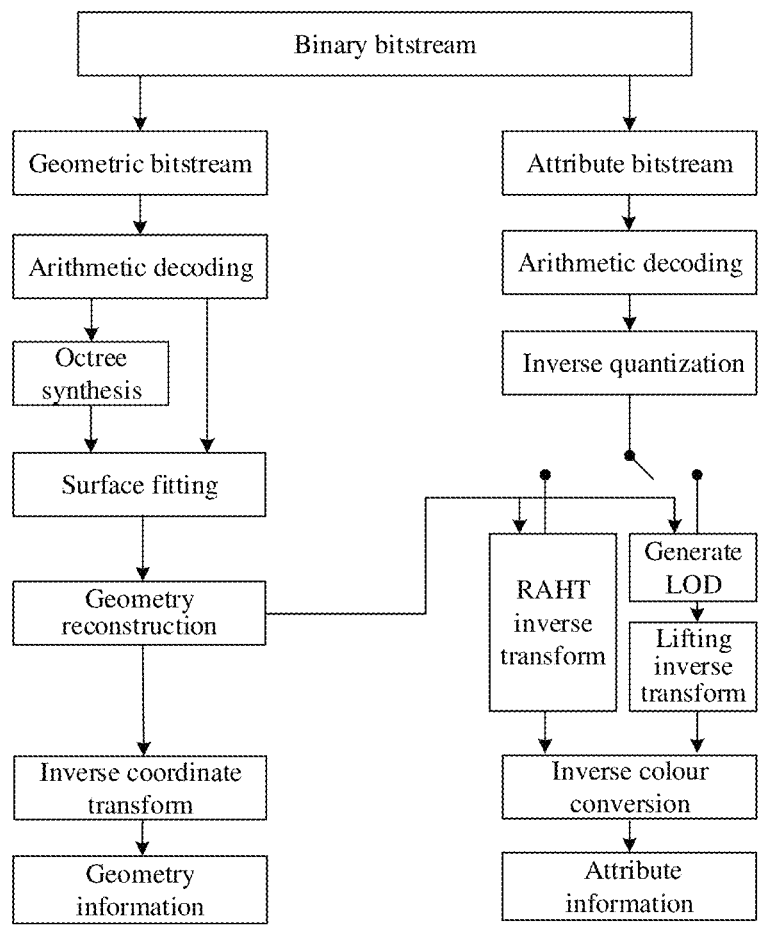
FIG. 2 is a flow block diagram of G-PCC decoding according to a related technical solution.

Referring to FIG. 2, FIG. 2 shows a flow block diagram of G-PCC decoding according to a related technical solution. In the flow block diagram of the G-PCC decoding as shown in FIG. 2, which is applied to a point cloud decoder, for obtained binary bitstreams, geometric bitstreams and attribute bitstreams in the obtained binary bitstreams are first decoded independently. Upon decoding of the geometric bitstreams, geometry information of point clouds is obtained through arithmetic decoding-octree synthesis-surface fitting-geometry reconstruction-inverse coordinate transform; upon decoding of the attribute bitstreams, attribute information of the point clouds is obtained through arithmetic decoding-inverse quantization-LOD-based lifting inverse transform or RAHT-based inverse transform-inverse colour conversion, and a three-dimensional picture model of point cloud data to be encoded is restored based on the geometry information and the attribute information.

In the flow block diagram of the G-PCC encoding shown in FIG. 1, LOD partitioning is mainly used for predicting and lifting in point cloud attribute transform. LOD partitioning based on distances will be described in detail below. Specifically, LOD partitioning is to partition input point clouds into different refinement levels (represented by $R_l$, $l=0,1,\ldots,N-1$) through a set of distance thresholds (represented by $d_l$, $l=0,1,\ldots,N-1$), that is, to partition points in the point clouds into different sets $R_l$. The distance thresholds may be self-defined values. The distance thresholds $d_l$ need to meet two conditions: $d_l < d_{l-1}$ and $d_{l-1}=0$.

A process of LOD partitioning is after geometry reconstruction of the point clouds, at this time geometric coordinate information of the point clouds may be obtained directly. The process of LOD partitioning may be applied to a point cloud encoder and a point cloud decoder at the same time. A specific process is as follows.

(1) All points in the point clouds are placed in an "unvisited" point set, and a "visited" point set (represented by V) is initialized as an empty set.

(2) LOD layers are partitioned through continuous iterations, and a process of generating a refinement level $R_l$ corresponding to the $l^{th}$ iteration is shown as follows.
  a. All points in the point clouds are traversed through iterations.
  b. If a current point has been traversed, this point is ignored.
  c. Otherwise, a distance from this point to each point in the set V is calculated respectively, and a nearest distance is recorded as D.
  d. If the distance D is greater than or equal to the threshold $d_l$, this point is added to the refinement level $R_l$ and the set V.
  e. The process from a to d is repeated until all points in the point clouds have been traversed.

(3) For the $l^{th}$ LOD set, that is, LODl is obtained by combining points in the refinement levels $R_0$, $R_1, \ldots, R_l$.

(4) The process from (1) to (3) is repeated for continuous iterations until all LOD layers are generated or all points have been traversed.

Figure 3A:
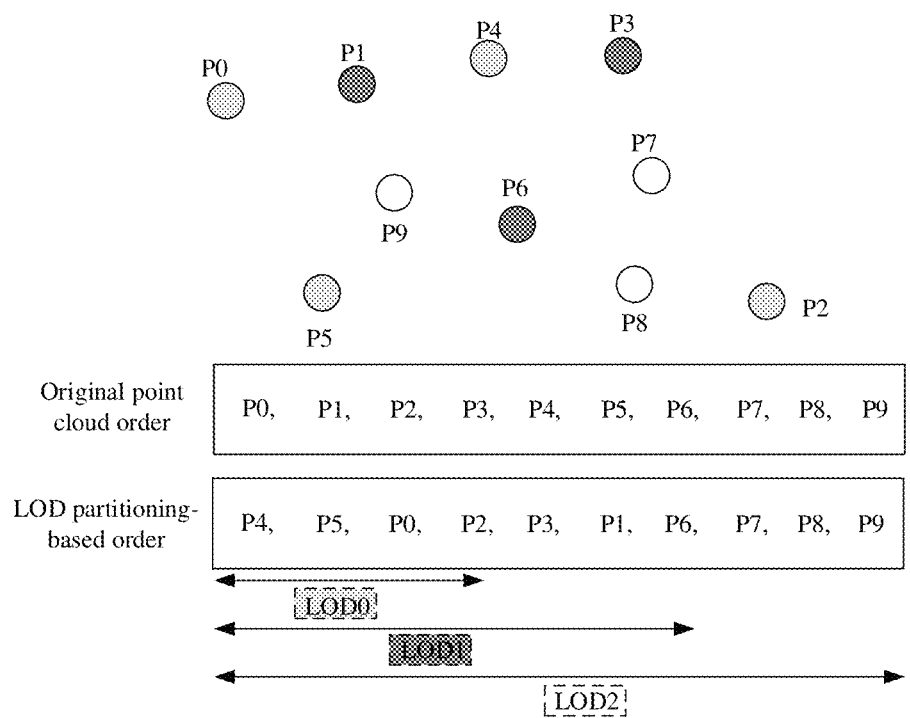
FIG. 3A is a schematic structural diagram of a LOD generation process according to a related technical solution.
Figure 10:
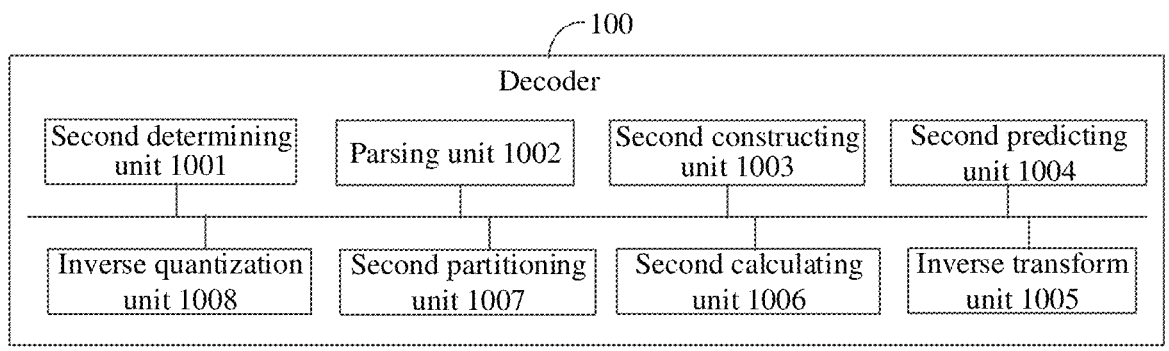
FIG. 10 is a schematic diagram of a structure of a decoder according to an embodiment of the present application.

Referring to FIG. 3A, which shows a schematic structural diagram of a LOD generation process according to a related technical solution. In FIG. 3A, 10 points, such as P0, P1, P2, P3, P4, P5, P6, P7, P8, and P9, are included in a point cloud, and LOD partitioning is performed based on distance thresholds. Thus, P4, P5, P0, and P2 are included sequentially in a set LOD0, P4, P5, P0, P2, P3, P1, and P6 are included sequentially in a set LOD1, and P4, P5, P0, P2, P3, P1, P6, P7, P8, and P9 are included sequentially in a set LOD2.

A solution of LOD partitioning based on Morton codes is mentioned in a related technology. Compared with an original solution of LOD partitioning by traversal search for all points, the solution of LOD partitioning based on Morton codes may decrease computational complexity.

Specifically, Morton code is also called z-order code, because its coding order follows a spatial z-order. Firstly, a variable $P_i$ represents a point in an input point cloud, and a variable $M_i$ is a Morton code related to $P_i$, wherein $i=1, \ldots, N$. A specific process of calculating Morton codes is shown as follows. Each component of a three-dimensional coordinate is represented by a d-bit binary numbers, three coordinate components of the three-dimensional coordinate are represented as follows.

$$x = \sum_{l=1}^{d} 2^{d-l} x_l, \ y = \sum_{l=1}^{d} 2^{d-l} y_l, \ z = \sum_{l=1}^{d} 2^{d-l} z_l.$$

$x_l$, $y_l$, $z_l \in \{0,1\}$ are binary values corresponding to the highest bit (l=1) to the lowest bit (l=d) of x, y, and z respectively. A Morton code M is sequential interlaced arrangement of x, y, and z from the highest bits to the lowest bits. A formula of calculating M is as follows.

$$M = \sum_{l=1}^{d} 2^{3(d-l)}(4x_l + 2y_l + z_l) = \sum_{l=1}^{3d} 2^{3d-l} m_l. \quad (1)$$

$m_{l'} \in \{0,1\}$ is a value of M from the highest bit (l'=1) to the lowest bit (l'=3d) respectively. After the Morton code M of each point in the point cloud is obtained, the points in the point cloud are arranged in an order of Morton codes from small to large.

Further, D0 (an initial distance threshold) and ρ (a distance threshold ratio when adjacent LOD layers are partitioned) are user-defined initial parameters respectively, and ρ>1. Assuming that I represents indexes of all points, and during the $k^{th}$ iteration, for points in a LODk layer, the nearest neighbors from a LOD0 layer to a LOD(k−1) layer, that is, the nearest points, will be searched; k=1, 2, ..., N−1. Here, N is the total number of the partitioned LOD layers; and when k=0, during the $0^{th}$ iteration, for points in the LOD0 layer, the nearest neighbors in the LOD0 layer will be searched directly. A specific process is as follows.

(1) A distance threshold during partitioning is initialized as $D=D_0$.

(2) During the $k^{th}$ iteration, points belonging to the LODk layer are saved in L(k), and a point set with a higher refinement level than that of the LODk layer are saved in O(k). A process of calculating L(k) and O(k) is as follows.

Firstly, O(k) and L(k) are initialized as empty sets.

Secondly, points are traversed in an order of indexes of saved points in I during each iteration. Specifically, geometric distances from a current point to all points in a range in the set O(k) will be calculated during each traversal, and an index of a first point that is greater than a Morton code corresponding to the current point is searched in the set O(k) based on the Morton code corresponding to the current point in I, and then searching is performed in a search range SR1 of the index (here, SR1 represents a search range based on a Morton code, and its value is generally 8, 16, and 64). If a point to which a distance from the current point is less than a threshold $d_t$ is found in this range, the current point is added to the set L(k); otherwise, the current point is added to the set O(k).

(3) During each iteration, the sets L(k) and O(k) are calculated respectively, and points in the O(k) will be used for predicting points in the set L(k). Assuming that a set R(k)=L(k)\L(k−1), that is, R(k) represents a point set of a difference between LOD(k−1) and LOD(k) sets. For points in the set R(k), the nearest h predicted neighbors (generally speaking, h may be set to 3) will be searched in the set O(k). A specific process of searching for the nearest neighbors is as follows.

a. A Morton code corresponding to a point $P_i$ in the set R(k) is $M_i$.
  b. An index j of a first point greater than the Morton code $M_i$ corresponding to the current point $P_i$ is searched in the set O(k).
  c. The nearest neighbors of the current point $P_i$ are searched in a search range [j−SR2, j+SR2] in the set O(k) based on the index j (here, SR2 represents a search range, and its value is generally 8, 16, 32, and 64).

(4) Iterations are performed continuously by repeating the process from (1) to (3) until all the points in I are traversed.

Figure 3B:
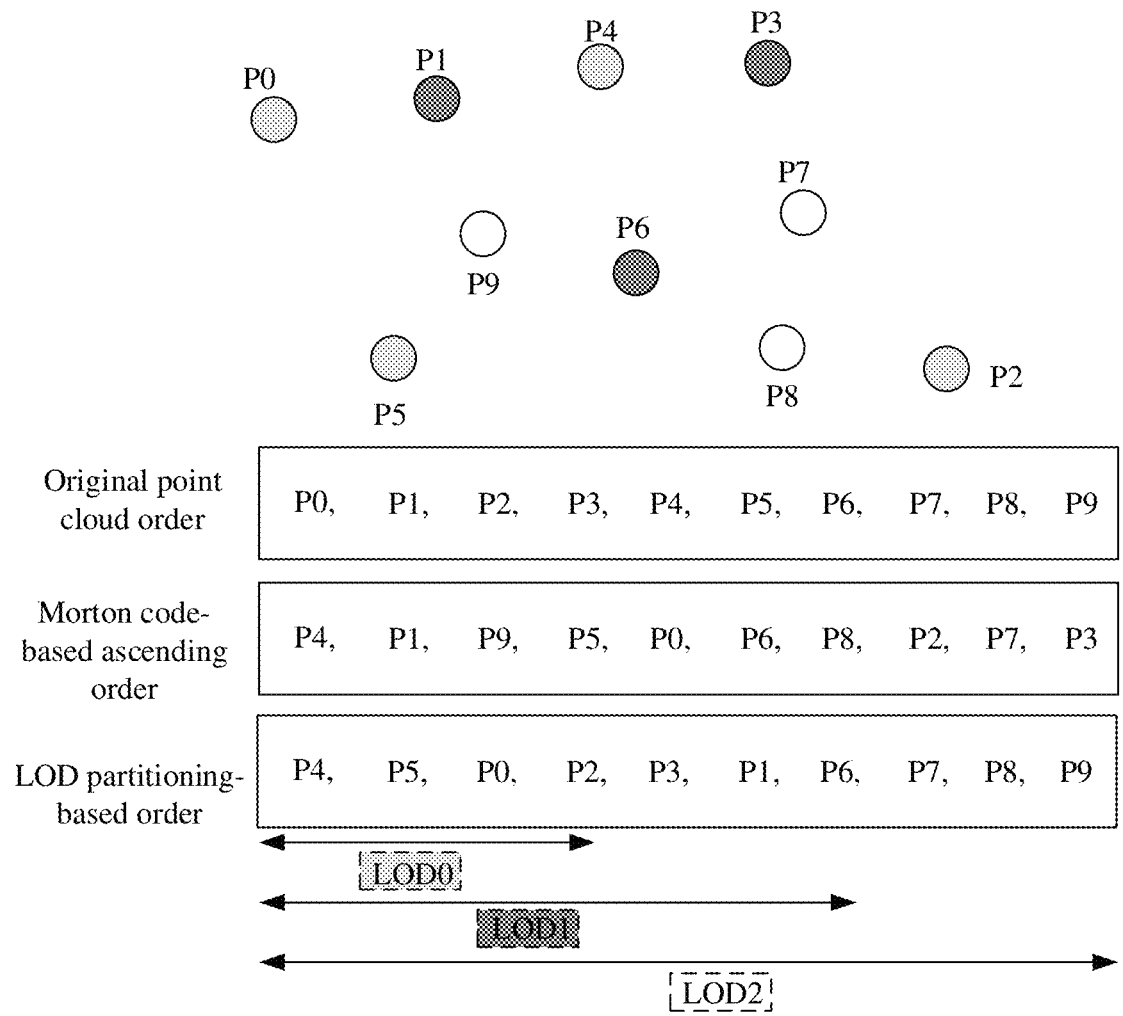
FIG. 3B is a schematic structural diagram of another LOD generation process according to a related technical solution.

Referring to FIG. 3B, which shows a schematic structural diagram of another LOD generation process according to a related technical solution. In FIG. 3B, 10 points, such as P0, P1, P2, P3, P4, P5, P6, P7, P8, and P9, are included in a point cloud, and LOD partitioning is performed based on Morton codes. These 10 points are arranged first in an ascending order of the Morton codes, and an order of the 10 points is P4, P1, P9, P5, P0, P6, P8, P2, P7, and P3. Then, the nearest neighbors are searched. Thus, P4, P5, P0, and P2 are still included sequentially in a set LOD0, P4, P5, P0, P2, P3, P1, and P6 are still included sequentially in a set LOD1, and P4, P5, P0, P2, P3, P1, P6, P7, P8, and P9 are still included sequentially in a set LOD2.

However, in a current solution, colour attributes of points in the LODk layer are predicted using the LOD(k−1) layer after LOD partitioning. Since three colour channels corresponding to attribute information are performed respectively, they are independent of each other. That is to say, in existing predicting and lifting in point cloud attribute transform, predicting of LOD is performed for three colour components (which may be represented by Y, U, and V respectively) of attribute through the three colour channels respectively, and prior to the predicting and lifting in the point cloud attribute transform, there is a correlation between the three colour components, such that a quantity of encoded bits will be increased during LOD and lifting transform, resulting in a decrease in an encoding efficiency.

An embodiment of the present application provides a prediction method, which is applied to an encoder. By determining a spatial block in which an encoding point is located; constructing a prediction model according to the spatial block, wherein the prediction model is used for characterizing a predicted relationship between a first colour component and a second colour component of the encoding point; then acquiring a value of the first colour component and a value of the second colour component of the encoding point; obtaining a prediction value of the second colour component of the encoding point using the prediction model and the value of the first colour component; finally calculating a difference between the value of the second colour component and the prediction value of the second colour component, using the obtained difference as a residual of the encoding point; and performing LOD partitioning and lifting transform based on the residual of the encoding point, thus another colour component may be predicted using one colour component to obtain a prediction value, so as to calculate a predicted residual according to an actual value and the prediction value, such that correlation between colour components may be removed and encoding bit overhead may be reduced effectively, thereby improving an encoding efficiency. This method may also be applied to a decoder. By determining a spatial block in which a decoding point is located; parsing an attribute bitstream to obtain a value of a first colour component and an initial residual of the decoding point, and a first model parameter and a second model parameter corresponding to the spatial block; constructing a prediction model according to the first model parameter and the second model parameter, wherein the prediction model is used for characterizing a predicted relationship between the first colour component and a second colour component of the decoding point; then obtaining a prediction value of the second colour component of the decoding point using the prediction model and the value of the first colour component; finally performing LOD partitioning and lifting inverse transform on the initial residual obtained by the parsing to determine a residual of the decoding point; and calculating a reconstructed value of the second colour component of the decoding point based on the residual of the decoding point and the prediction value of the second colour component, thus another colour component may be predicted using one colour component to obtain a prediction value, so as to reconstruct an attribute value according to the prediction value and a predicted residual obtained by parsing, such that correlation between colour components prior to the LOD partitioning and lifting transform may be removed and encoding bit overhead may be reduced effectively, thereby improving an encoding and decoding efficiency.

Various embodiments of the present application will be described in detail below in combination with the accompanying drawings.

Figure 4:
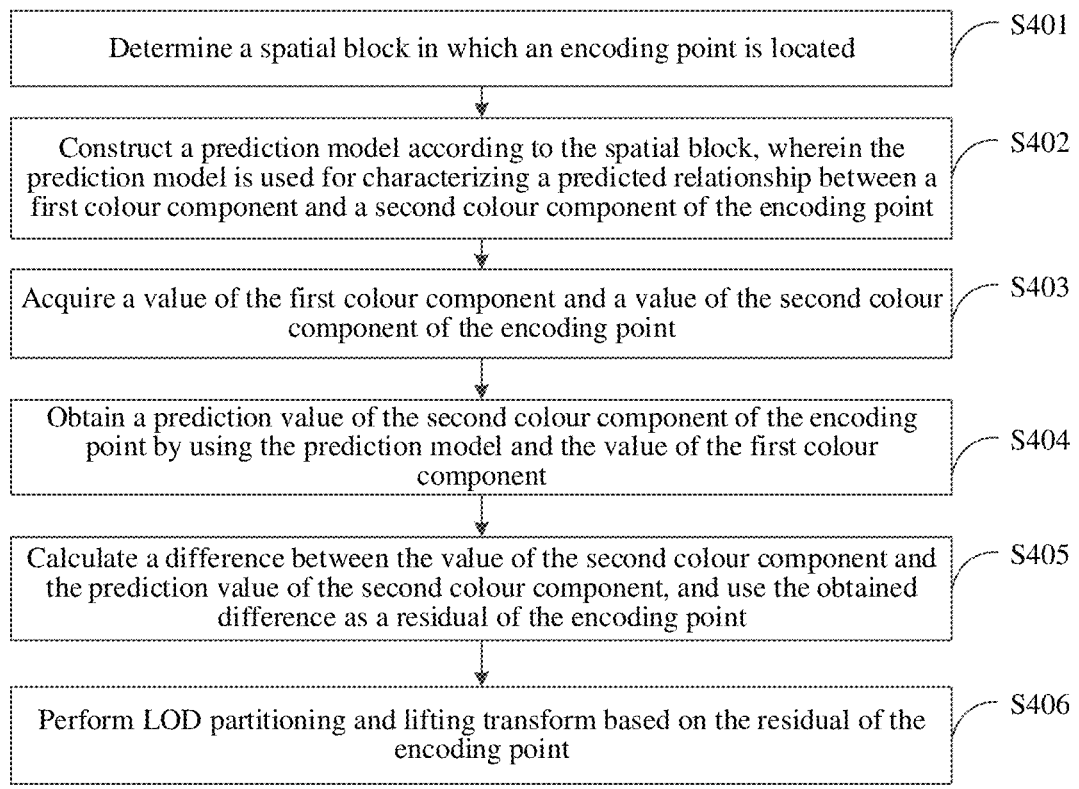
FIG. 4 is a schematic flowchart of a prediction method according to an embodiment of the present application.

Referring to FIG. 4, FIG. 4 shows a schematic flowchart of a prediction method according to an embodiment of the present application. The method is applied to an encoder (which may also called a point cloud encoder), and may include the following acts.

In S401, a spatial block in which an encoding point is located is determined.

In S402, a prediction model is constructed according to the spatial block, wherein the prediction model is used for characterizing a predicted relationship between a first colour component and a second colour component of the encoding point.

It should be noted that the encoding point represents point cloud data of an object to be encoded in a point cloud. A plurality of spatial blocks may be obtained by partitioning spatially the point cloud. A spatial block in which the encoding point is located may be determined from the plurality of spatial blocks, so that the prediction model may be constructed subsequently according to the spatial block, thereby implementing prediction between colour components.

It should also be noted that for each encoding point in a space, the first colour component, the second colour component, and a third colour component may be used for representing three colour attributes of the encoding point. The three colour attributes may be represented by Y, U, and V. Specifically, the first colour component may be represented by Y, the second colour component may be represented by U, and the third colour component may be represented by V; or the first colour component may be represented by Y, the second colour component may be represented by V, and the third colour component may be represented by U; which is not limited specifically in the embodiments of the present application.

In addition, the three-colour attributes may be represented by R, G, and B. Specifically, the first colour component may be represented by R, the second colour component may be represented by G, and the third colour component may be represented by B; or the first colour component may be represented by R, the second colour component may be represented by B, and the third colour component may be represented by G; which is not limited specifically in the embodiments of the present application.

Thus, the prediction model, which may characterize the predicted relationship between the first colour component and the second colour component of the encoding point, may be constructed according to the spatial block in which the encoding point is located. That is to say, by using the prediction model, the second colour component of the encoding point may be predicted according to the first colour component of the encoding point. Specifically, assuming that the first colour component is represented by Y and the second colour component is represented by U, the prediction model may be used for predicting the component U according to the component Y of the encoding point, that is, the prediction method of the embodiment of the present application is applicable to prediction of the component U using the component Y; assuming that the first colour component is represented by Y and the second colour component is represented by V, the prediction model may also be used for predicting the component V according to the component Y of the encoding point, that is, the prediction method of the present application embodiment is also applicable to prediction of the component V using the component Y.

In S403, a value of the first colour component and a value of the second colour component of the encoding point are acquired.

In S404, a prediction value of the second colour component of the encoding point is obtained using the prediction model and the value of the first colour component.

It should be noted that after the prediction model is constructed, in order to predict the second colour component of the encoding point, the value of the first colour component of the encoding point also needs to be acquired. Thus, the prediction value of the second colour component of the encoding point may be obtained through the prediction model according to the acquired value of the first colour component of the encoding point.

It should also be noted that if the prediction model is used for predicting the component U according to the component Y of the encoding point, then the acquired value of the first colour component is a value of the component Y and the value of the second colour component is a value of the component U, so that a prediction value of the component U of the encoding point may be obtained according to the prediction model and the value of the component Y, and then a residual may be calculated according to the value of the component U and the prediction value of the component U; if the prediction model is used for predicting the component V according to the component Y of the encoding point, then the acquired value of the first colour component is the value of the component Y and the value of the second colour component is a value of the component V, so that a prediction value of the component V of the encoding point may be obtained according to the prediction model and the value of the component Y, and then a residual may be calculated according to the value of the component V and the prediction value of the component V.

In S405, a difference between the value of the second colour component and the prediction value of the second colour component is calculated, and the obtained difference is used as a residual of the encoding point.

In S406, Level of Detail (LOD) partitioning and lifting transform are performed based on the residual of the encoding point.

It should be noted that after the prediction value of the second colour component of the encoding point is obtained, the residual of the encoding point may be obtained according to the difference between the value (actual value) of the second colour component and the prediction value of the second colour component of the encoding point, and then the LOD partitioning and lifting transform are performed according to the residual of the encoding point.

Thus, in the embodiment of the present invention, lossless prediction may be made on attribute information of the point cloud, and encoding bit overhead may be reduced effectively in a case that same picture encoding quality is obtained, thereby improving an encoding efficiency. An objective quality evaluation criterion such as Peak Signal to Noise Ratio (PSNR) may be used for picture encoding quality, and a subjective quality evaluation criterion such as Mean Opinion Score (MOS) may also be used for the picture encoding quality.

Further, after the LOD partitioning and lifting transform are performed, the residual of the encoding point needs to be encoded and signalled in a bitstream. Therefore, in some embodiments, after the LOD partitioning and lifting transform are performed on the residual of the encoding point, the method may further include: the residual of the encoding point is encoded and signalled in an attribute bitstream.

It should be noted that the bitstream may include a geometric bitstream and an attribute bitstream. The geometric bitstream includes geometry information of the point cloud, such as position coordinate information; the attribute bitstream includes attribute information of the point cloud, such as three-colour information. Thus, after the LOD partitioning and lifting transform are performed, the residual of the encoding point needs to be encoded and signalled in the attribute bitstream, and then transmitted from an encoder side to a decoder side, and the attribute bitstream is parsed at the decoder side, so as to obtain the residual of the encoding point at the decoder side.

Figure 5:
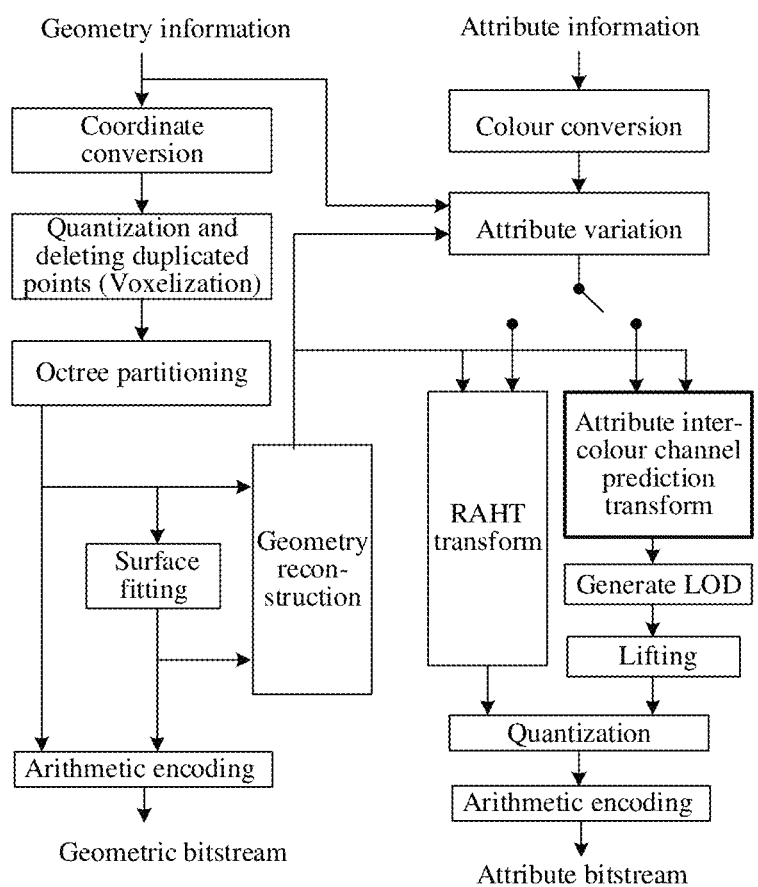
FIG. 5 is a flow block diagram of G-PCC encoding according to an embodiment of the present application.

Referring to FIG. 5, FIG. 5 shows a flow block diagram of G-PCC encoding according to an embodiment of the present application. As shown in FIG. 5, compared with the flow block diagram of encoding shown in the related technical solution, a part of attribute inter-colour channel prediction transform is added prior to the LOD partitioning and lifting transform. The prediction method of the embodiment of the present invention is mainly applied to the part to implement attribute prediction between colour channels. Thus, another colour component is predicted using one colour component prior to the LOD partitioning and lifting transform to obtain a prediction value, such that correlation between three colour channels may be removed, thereby improving an encoding efficiency.

An embodiment of the present application provides a prediction method, which may be applied to an encoder. By determining a spatial block in which an encoding point is located; constructing a prediction model according to the spatial block, wherein the prediction model is used for characterizing a predicted relationship between a first colour component and a second colour component of the encoding point; then acquiring a value of the first colour component and a value of the second colour component of the encoding point; obtaining a prediction value of the second colour component of the encoding point using the prediction model and the value of the first colour component; finally calculating a difference between the value of the second colour component and the prediction value of the second colour component, using the obtained difference as a residual of the encoding point; and performing Level of Detail (LOD) partitioning and lifting transform based on the residual of the encoding point, thus another colour component may be predicted using one colour component to obtain a prediction value, so as to calculate a predicted residual according to an actual value and the prediction value, such that correlation between colour components may be removed and encoding bit overhead may be reduced effectively, thereby improving an encoding efficiency.

Further, the spatial block may be obtained by partitioning spatially the point cloud.

Therefore, in some embodiments, for S401, the determining the spatial block in which the encoding point is located, may include following acts.

In S401-a, the point cloud is partitioned spatially to obtain at least one spatial block.

It should be noted that since a process of LOD partitioning is performed along z, y, and x directions according to Morton codes, then the closer the distance between three colour components (such as a component Y, a component U, and a component V) is, the higher the correlation of points is. Based on this, the point cloud may be partitioned spatially, so that the at least one spatial block may be obtained.

In some embodiments, the point cloud may be partitioned into a plurality of spatial blocks according to a spatial adjacency relationship between points. Therefore, for S401-a, the partitioning spatially the point cloud to obtain the at least one spatial block may include: partitioning the point cloud into a plurality of point sets according to the spatial adjacency relationship between the points in the point cloud, and determining a first degree of correlation between the first colour component and the second colour component in each of the point sets; and partitioning spatially the point cloud according to the determined first degree of correlation, to obtain the at least one spatial block.

That is to say, the point cloud may be partitioned into the plurality of point sets according to the spatial adjacency relationship between the points in the point cloud, so that the first degree of correlation between the first colour component and the second colour component in each of the point sets may be determined, and then the point cloud may be partitioned into spatial blocks with high correlation between colour components.

Specifically, the point cloud may be partitioned spatially according to the first degree of correlation between the component Y and the component U in each of the point sets, or the point cloud may be partitioned spatially according to the first degree of correlation between the component Y and the component V in each of the point sets. Since the closer the distance between the colour components is, the higher the correlation of points is, the point cloud is partitioned spatially according to the first degree of correlation between colour components, so as to obtain at least one spatial block.

In some embodiments, the point cloud may be partitioned into a plurality of spatial blocks according to Morton codes of points in the point cloud. Therefore, for S401-a, the partitioning spatially the point cloud to obtain the at least one spatial block includes: calculating the Morton codes of the points in the point cloud; arranging the Morton codes of the points in the point cloud in an ascending order, and determining a maximum value of the Morton codes and a minimum value of the Morton codes; calculating a difference between the maximum value of the Morton codes and the minimum value of the Morton codes, and shifting the obtained difference to right by N bits to obtain a shifted difference, wherein N is a positive integer greater than or equal to 1; and partitioning the point cloud into a quantity, which equals to the shifted difference, of spatial blocks when the shifted difference meets a preset range.

It should be noted that the points in the point cloud may be all points in the point cloud or a portion of points in the point cloud, and these points are relatively concentrated spatially. Thus, for partitioning of the spatial blocks, Morton codes of these points may be calculated and the calculated Morton codes may be arranged in an ascending order, that is, the obtained Morton codes are arranged in an order from small to large; then, a maximum value of the Morton codes and a minimum value of the Morton codes are determined, and then a difference (which may be represented by delta) between the maximum value of the Morton codes and the minimum value of the Morton codes is calculated.

By shifting delta bits to right, a shifted delta may be obtained after the delta bits are shifted to right by N bits, such that the shifted delta may meet a preset range, at this time the point cloud may be partitioned into a quantity, which equals to the shifted delta, of spatial blocks. Shifting the delta bits to right by N bits may be regarded as shifting a maximum value bit of the Morton codes to right by N bits and shifting a minimum value bit of the Morton codes to right by N bits, then a difference between the maximum value bit and the minimum value bit is calculated, and the obtained difference means that the delta bits are shifted to right by N bits.

In addition, the preset range indicates a range that needs to be met by a quantity of spatial blocks obtained by partitioning the point cloud. Here, the preset range may be 16<delta≤32 or 8<delta≤16, which is not specifically limited in the embodiments of the present application.

Further, after the Morton codes of the points in the point cloud are calculated, the method may further include: shifting the Morton codes of the points in the point cloud to right by N bits; and determining that a portion of points in the point cloud belongs to a same spatial block if values of shifted Morton codes of the portion of the points are the same.

It should be noted that the Morton codes of the points in the point cloud are shifted to right by N bits, so that if values of shifted Morton codes of a portion of points in these points are the same, the portion of the points may be determined to belong to a same spatial block, that is, points, of which values of right-shifted Morton codes are the same, may be marked as "located in a same spatial block".

In S401-b, a spatial block in which the encoding point is located is determined from the at least one spatial block based on a geometric position of the encoding point.

It should be noted that the at least one spatial block may be obtained by partitioning spatially the point cloud. Thus, the spatial block in which the encoding point is located may be determined from the at least one spatial block according to the geometric position of the encoding point, so as to facilitate constructing a prediction model according to the spatial block subsequently.

It should also be noted that a shape of the spatial block includes at least one of: a cube shape, a cuboid shape, and an irregular shape.

The spatial block may be one of cuboids into which the point cloud is partitioned in a three-dimensional space, and a size of the cuboid is a×b×c, wherein values of a, b, and c may or may not be equal. Here, when the values of a, b, and c are equal, that is, a cube is regarded as a special cuboid.

In addition, the spatial block may also be a spatial block in an irregular shape with strong correlation between colour components, such as a triangular prism or a polyhedron, which may also be used for removing correlation of attribute colours to obtain a predicted residual of the second colour component.

Further, after the spatial block of the encoding point is determined, a portion of points may be selected from the spatial block to form a point set, which is used for constructing the prediction model. Therefore, in some embodiments, for S402, the constructing the prediction model according to the spatial block may include: selecting K points from the spatial block, and combining the selected K points into a point set, wherein K is a positive integer greater than or equal to 20; determining model parameters based on the K points in the point set, wherein the model parameters include a first model parameter and a second model parameter; and constructing the prediction model according to the first model parameter and the second model parameter.

It should be noted that in the spatial block, K points may be selected from points contained in the spatial block and the selected K points may be combined into a point set. Here, a value of K may be a positive integer greater than or equal to 20, which is not specifically limited in the embodiments of the present application.

Exemplarily, according to an order of Morton codes, one point may be selected from every k (100<k<500) points in the spatial block. If a quantity of points contained in the spatial block is too small, 20 points may be selected evenly, so that a quantity of points selected in each spatial block is not less than 20 points. Assuming that the point set is represented by V, a point set $V_i\{=0, 1, \ldots, n\}$ corresponding to each spatial block represents a set of selected points in the $i^{th}$ spatial block, wherein n represents a quantity of spatial blocks.

Thus, after the point set is formed from the selected points, the first model parameter and the second model parameter may be determined according to colour attribute values (such as a value of a first colour component, a value of a second colour component, or a value of a third colour component) of these points in the point set, and then the prediction model may be constructed according to the first model parameter and the second model parameter.

Further, in some embodiments, the determining the model parameters based on the K points in the point set may include: acquiring a value of a first colour component and a value of a second colour component of each point in the point set; calculating the first model parameter using a first calculation sub-model according to the value of the first colour component and the value of the second colour component of each point in the point set; and calculating the second model parameter using a second calculation sub-model according to the first model parameter.

It should be noted that constructing of the prediction model may be regarded as fitting of a straight line. That is, after the first model parameter and the second model parameter are determined, a fitted straight line may be obtained according to the first model parameter and the second model parameter. Fitting a straight line using the least square method will be described below in detail as an example, and a specific process is as follows.

Firstly, for any point $(x_i, y_i)$ in the point set, a coordinate $x_i$ represents a value of a first colour component value (represented by a value of a component Y) of the any point, and a coordinate $y_i$ represents a value of a second colour component (represented a value of a component U) of the any point, thus a fitted straight line obtained according to the value of the component Y and the value of the component U is $y=a+bx$.

Secondly, for any point $(x_i, y_i)$ in the point set, an error is $d_i=y-(a+bx_i)$, so when a minimum value of $$D = \sum_{i=1}^{n} d_i^2 = \sum_{i=1}^{n} (y_i - a - bx_i)^2$$

is taken, a fitting degree of the fitted straight line is the highest. Thus, first-order partial derivatives for a and b are obtained respectively as follows.

$$\frac{\partial D}{\partial a} = \sum_{i=1}^{n} 2(y_i - a - bx_i) \cdot (-1) = -2\left(\sum_{i=1}^{n} y_i - na - b\sum_{i=1}^{n} x_i\right) \quad (2)$$

$$\frac{\partial D}{\partial b} = \sum_{i=1}^{n} 2(y_i - a - bx_i) \cdot (-x_i) = -2\left(\sum_{i=1}^{n} x_i y_i - a\sum_{i=1}^{n} x_i - b\sum_{i=1}^{n} x_i^2\right) \quad (3)$$

Thirdly, letting $$\frac{\partial D}{\partial a} = 0 \text{ and } \frac{\partial D}{\partial b} = 0, \text{ and } \bar{x} = \frac{1}{n}\sum_{i=1}^{n} x_i \text{ and } \bar{y} = \frac{1}{n}\sum_{i=1}^{n} Y_i,$$

then the equations (2) and (3) are solved jointly to obtain following equations.

$$b = \frac{\sum_{i=1}^{n} x_i y_i - \bar{y}\sum_{i=1}^{n} x_i}{\sum_{i=1}^{n} x_i^2 - \bar{x}\sum_{i=1}^{n} x_i} = \frac{\sum_{i=1}^{n} (x_i - \bar{x})(y_i - \bar{y})}{\sum_{i=1}^{n} (x_i - \bar{x})^2} \quad (4)$$

$$a = \bar{y} - b\bar{x} \quad (5)$$

Finally, the equation (4) is used for representing a first calculation sub-model for calculating a first model parameter, and the equation (5) is used for representing a second calculation sub-model for calculating a second model parameter. Thus, the first model parameter b may be obtained through the first calculation sub-model, and the second model parameter a may be obtained through the second calculation sub-model, so that the fitted straight line, that is, the prediction model, may be obtained.

Thus, after the prediction model between the value of the component Y and the value of the component U is obtained, the component U may be predicted using the component Y according to the prediction model, so as to obtain a prediction value of the component U; an actual value and the prediction value are then used for obtaining a residual, and an original attribute value is replaced with the obtained residual, and then subsequent LOD partitioning and lifting transform are performed.

It should also be noted that, for constructing of the prediction model, that is, fitting of the straight line, after the point set is selected from the spatial block, in addition to fitting the straight line using the least square method, the straight line may also be fitted using different methods from the least square method, such as the gradient descent method or Gauss Newton method. In addition, a segmented straight line or curve may also be fitted using colour attribute values of these points in the point set, so as to obtain the prediction model. Then, model parameters involved in the prediction model are signalled in the attribute bitstream.

Further, in some embodiments, for S405, after the LOD partitioning and lifting transform are performed on the residual of the encoding point, the method may further include: signalling the first model parameter and the second model parameter in the attribute bitstream.

It should be noted that after the first model parameter and the second model parameter are determined, the first model parameter and the second model parameter may be signalled in the attribute bitstream, and then transmitted from an encoder side to a decoder side, and the attribute bitstream may be parsed at the decoder side, so that the decoder side only needs to acquire the first model parameter and the second model parameter, thereby improving an encoding efficiency.

Further, after the first model parameter and the second model parameter are determined, the first model parameter and the second model parameter may be further modified. The first model parameter and the second model parameter may be quantized and then signalled in the attribute bitstream. Or, model parameters (including the first model parameter and the second model parameter) of a first spatial block may only be signalled in the attribute bitstream, while model parameters of remaining spatial blocks are modified to be values of residuals of model parameters compared with the first spatial block, and then the values of the residuals are signalled in the attribute bitstream in turn.

Optionally, in some embodiments, the signalling the first model parameter and the second model parameter in the attribute bitstream may include: quantizing the first model parameter and the second model parameter to obtain a quantized first model parameter and a quantized second model parameter; and signalling the quantized first model parameter and the quantized second model parameter in the attribute bitstream.

It should be noted that if the first model parameter and the second model parameter are quantized at the encoder side, inverse quantization needs to be performed on the first model parameter and the second model parameter after the attribute bitstream is parsed at the decoder side.

Optionally, in some embodiments, the signalling the first model parameter and the second model parameter in the attribute bitstream may include: signalling the first model parameter and the second model parameter corresponding to the first spatial block of the at least one spatial block in the attribute bitstream; and calculating values of residuals of model parameters of remaining spatial blocks with respect to a previous spatial block in the at least one spatial block, and signalling the values of the residuals of the model parameters in the attribute bitstream in turn.

It should be noted that the at least one spatial block includes the first spatial block and the remaining spatial blocks. For the first model parameter and the second model parameter, if model parameters (including the first model parameter and the second model parameter) of the first spatial block are first signalled in the attribute bitstream at the encoder side, model parameters of the remaining spatial blocks are modified to be values of residuals of model parameters compared with the first spatial block, and the values of the residuals are then signalled in the attribute bitstream in turn, then after the attribute bitstream is parsed at the decoder side, the model parameters of the remaining spatial blocks need to be determined according to values of the residuals of the model parameters obtained by the parsing.

Further, in some embodiments, the method may further include: for the spatial block, calculating a second degree of correlation between the first colour component and the second colour component corresponding to the spatial block; if the second degree of correlation is less than a preset threshold of degree of correlation, shifting a Morton code of each point in the spatial block to right by N−1 bits to obtain two sub-spatial blocks; calculating a third degree of correlation between the first colour component and the second colour component corresponding to the two sub-spatial blocks; constructing two sub-prediction models according to the two sub-spatial blocks if the third degree of correlation is greater than the second degree of correlation; and obtaining a prediction value of the second colour component of the encoding point using the two sub-prediction models and the value of the first colour component.

It should be noted that when spatial blocks are partitioned in a point cloud, correlation between colour channels is calculated according to a selected point set in a spatial block to obtain a second degree of correlation, i.e., correlation of a parent spatial block. When the calculated second degree of correlation is lower, for points in the spatial block, a quantity of right-shifted bits of is reduced by one (assuming that a quantity of right-shifted bits is N, then the quantity of the right-shifted bits is reduced by one to be N−1), at this time the spatial block may be partitioned into two sub-spatial blocks. Then, correlation between colour channels is calculated for the two sub-spatial blocks to obtain a third degree of correlation, that is, correlation of the two sub-spatial blocks. If the correlation of the two sub-spatial blocks is significantly greater than that of the parent spatial block, then the mode of partitioning the spatial block into two sub-spatial blocks may be used, that is, prediction between the colour channels may be performed using the two sub-spatial blocks respectively, that is, two sub-prediction models are constructed according to the two sub-spatial blocks, so as to predict the second colour component according to the first colour component; otherwise, if the correlation of the two sub-spatial blocks is less than or equal to that of the parent spatial block, then prediction may be performed using the parent spatial block, that is, the flow of the prediction method shown in FIG. 4 is performed.

In the embodiments of the present application, encoding performance of an attribute encoding part of G-PCC may be improved. Bit rates of a first colour channel (represented by Y), a second colour channel (represented by U), and a third colour channel (represented by V) of an attribute part may be decreased under a premise that the encoding performance is basically not affected, for example, in a case that an attribute PSNR is not affected. Here, the PSNR is an objective evaluation criterion of picture encoding quality, and the larger the PSNR is, the better the picture encoding quality is.

This embodiment provides the prediction method, which is applied to the encoder. Specific implementations of the foregoing embodiments are described in detail through the embodiments described above. It may be seen that another colour component is predicted using one colour component to obtain a prediction value, so as to calculate a predicted residual according to an actual value and the prediction value, such that correlation between colour components may be removed and encoding bit overhead may be reduced effectively, thereby improving an encoding efficiency.

Figure 6:
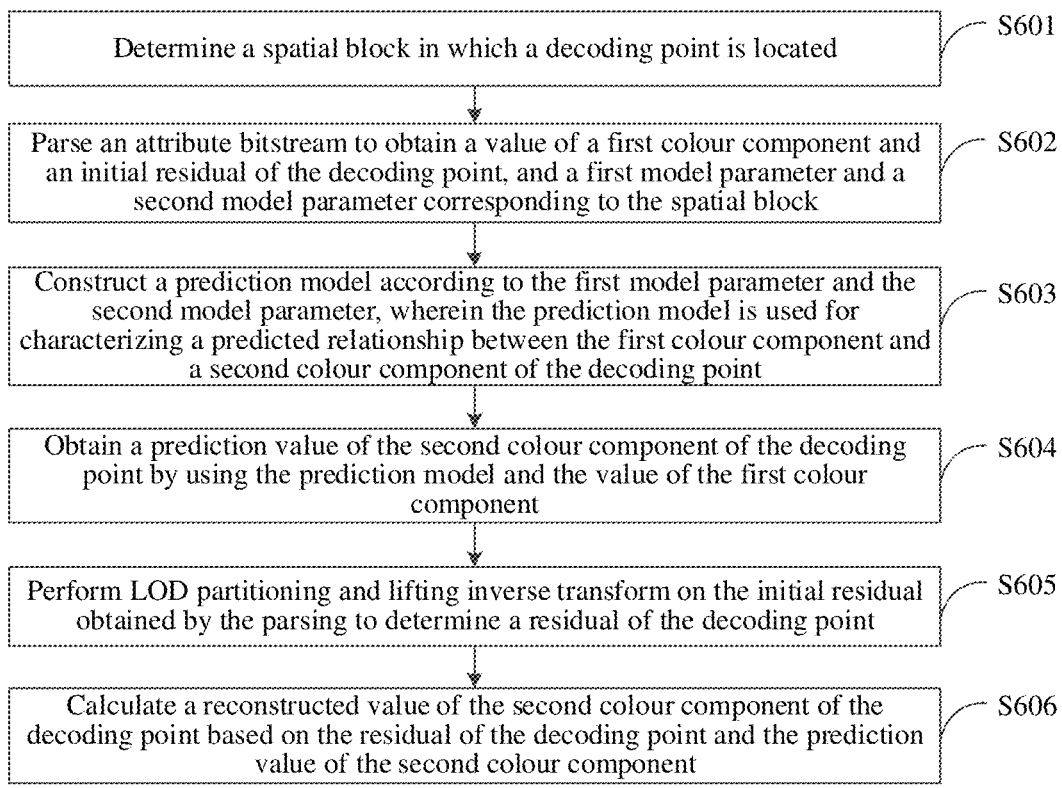
FIG. 6 is a schematic flowchart of another prediction method according to an embodiment of the present application.

Referring to FIG. 6, which shows a schematic flowchart of another prediction method according to an embodiment of the present application, which is applied to a decoder (also called a point cloud decoder), and may include following acts.

In S601, a spatial block in which a decoding point is located is determined.

It should be noted that the decoding point represents point cloud data of an object to be decoded in a point cloud. A plurality of spatial blocks may be obtained by partitioning spatially the point cloud. The spatial block in which the decoding point is located may be determined from the plurality of spatial blocks, so that a prediction model may be constructed subsequently according to the spatial block, thereby implementing prediction between colour components.

It should also be noted that for each decoding point in a space, a first colour component, a second colour component, and a third colour component may be used for representing three colour attributes of the decoding point. The three colour attributes may be represented by Y, U, and V. Specifically, the first colour component may be represented by Y, the second colour component may be represented by U, and the third colour component may be represented by V; or the first colour component may be represented by Y, the second colour component may be represented by V, and the third colour component may be represented by U; which is not limited specifically in the embodiments of the present application.

In addition, the three-colour attributes may be represented by R, G, and B. Specifically, the first colour component may be represented by R, the second colour component may be represented by G, and the third colour component may be represented by B; or the first colour component may be represented by R, the second colour component may be represented by B, and the third colour component may be represented by G; which is not limited specifically in the embodiments of the present application.

In S602, an attribute bitstream is parsed to obtain a value of a first colour component and an initial residual of the decoding point, and a first model parameter and a second model parameter corresponding to the spatial block.

It should be noted that when a bitstream is transmitted from an encoder side to a decoder side, the bitstream may be parsed at the decoder side. Here, the bitstream may include a geometric bitstream and an attribute bitstream. The geometric bitstream includes geometry information of the point cloud, and the geometry information of the point cloud, such as position coordinates of the decoding point, may be obtained by parsing the geometric bitstream at the decoder side. The attribute bitstream includes attribute information of the point cloud, and the attribute information of the point cloud, such as the value of the first colour component and the initial residual of the decoding point, and the first model parameter and the second model parameter corresponding to the spatial block, may be obtained by parsing the attribute bitstream at the decoder side.

In S603, a prediction model is constructed according to the first model parameter and the second model parameter, wherein the prediction model is used for characterizing a predicted relationship between the first colour component and the second colour component of the decoding point.

It should be noted that the prediction model, which may characterize the predicted relationship between the first colour component and the second colour component of the decoding point, may be constructed according to the first model parameter and the second model parameter.

That is to say, by using the prediction model, the second colour component of the decoding point may be predicted according to the first colour component of the decoding point. Specifically, assuming that the first colour component is represented by Y and the second colour component is represented by U, the prediction model may be used for predicting the component U according to the component Y of the decoding point, that is, the prediction method of the embodiment of the present application is applicable to prediction of the component U using the component Y; assuming that the first colour component is represented by Y and the second colour component is represented by V, the prediction model may also be used for predicting the component V according to the component Y of the decoding point, that is, the prediction method of the present application embodiment is also applicable to prediction of the component V using the component Y.

In S604, a prediction value of the second colour component of the decoding point is obtained using the prediction model and the value of the first colour component.

It should be noted that after the prediction model is constructed, in order to predict the second colour component of the decoding point, at this time the value of the first colour component of the decoding point also needs to be acquired. Thus, the prediction value of the second colour component of the decoding point may be obtained through the prediction model according to the acquired value of the first colour component of the decoding point.

It should also be noted that if the prediction model is used for predicting the component U according to the component Y of the decoding point, then the acquired value of the first colour component is a value of the component Y and the value of the second colour component is a value of the component U, so that a prediction value of the component U of the decoding point may be obtained according to the prediction model and the value of the component Y; or, if the prediction model is used for predicting the component V according to the component Y of the decoding point, then the acquired value of the first colour component is the value of the component Y and the value of the second colour component is a value of the component V, so that a prediction value of the component V of the decoding point may be obtained according to the prediction model and the value of the component Y.

In S605, LOD partitioning and lifting inverse transform are performed on the initial residual obtained by the parsing to determine a residual of the decoding point.

In S606, a reconstructed value of the second colour component of the decoding point is calculated based on the residual of the decoding point and the prediction value of the second colour component.

It should be noted that after the initial residual is obtained by the parsing, the LOD partitioning and lifting inverse transform needs to be performed on the initial residual, so as to determine the residual of the decoding point.

Thus, after the residual of the decoding point and the prediction value of the second colour component are obtained, the residual of the decoding point and the prediction value of the second colour component are superimposed to obtain the reconstructed value of the second colour component of the decoding point.

Figure 7:
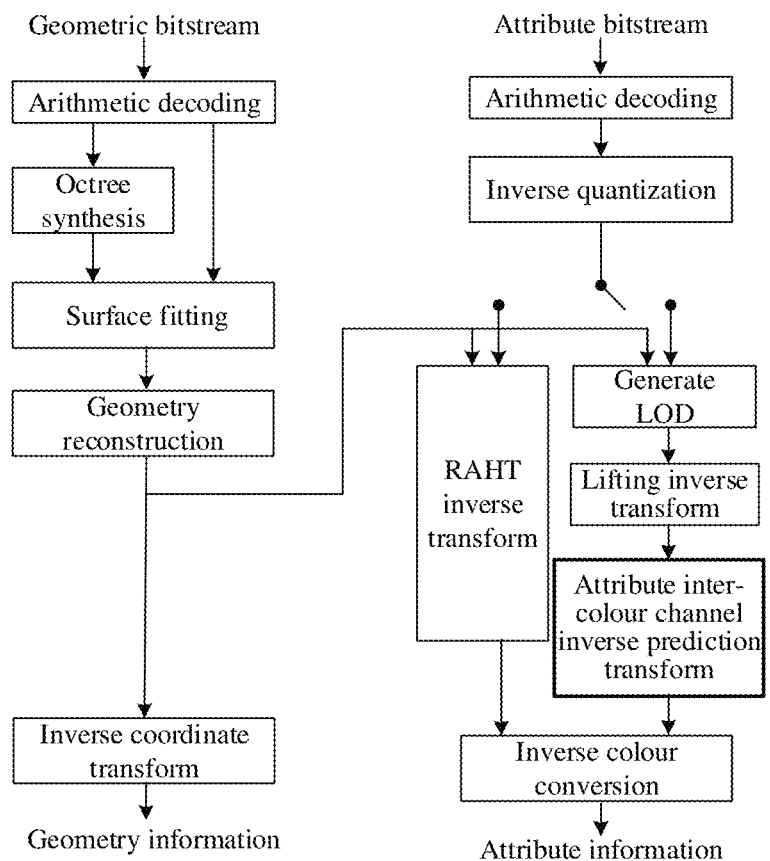
FIG. 7 is a flow block diagram of G-PCC decoding according to an embodiment of the present application.

Referring to FIG. 7, FIG. 7 shows a flow block diagram of G-PCC decoding according to an embodiment of the present application. As shown in FIG. 7, compared with the flow block diagram of the decoding shown in the related technical solution, a part of attribute inter-colour channel inverse prediction transform is added after the LOD partitioning and lifting inverse transform. The prediction method of the embodiment of the present invention is mainly applied to the part to implement attribute prediction between colour channels. Thus, another colour component is predicted using one colour component after the LOD partitioning and lifting inverse transform to obtain a prediction value, so that lossless prediction may be made on attribute information of a point cloud, correlation between three colour channels may be removed, and bit overhead may be reduced effectively in a case that same picture decoding quality is obtained, thereby improving a decoding efficiency. An objective quality evaluation criterion such as Peak Signal to Noise Ratio (PSNR) may be used for picture decoding quality, and a subjective quality evaluation criterion such as Mean Opinion Score (MOS) may also be used for the picture decoding quality.

An embodiment of the present application provides a prediction method, which may be applied to a decoder. By determining a spatial block in which a decoding point is located; parsing an attribute bitstream to obtain a value of a first colour component and an initial residual of the decoding point, and a first model parameter and a second model parameter corresponding to the spatial block; constructing a prediction model according to the first model parameter and the second model parameter, wherein the prediction model is used for characterizing a predicted relationship between the first colour component and a second colour component of the decoding point; then obtaining a prediction value of the second colour component of the decoding point using the prediction model and the value of the first colour component; finally performing LOD partitioning and lifting inverse transform on an initial residual obtained by parsing to determine a residual of the decoding point; and calculating a reconstructed value of the second colour component of the decoding point based on the residual of the decoding point and the prediction value of the second colour component, thus another colour component may be predicted using one colour component to obtain a prediction value, so as to reconstruct an attribute value according to the prediction value and a predicted residual obtained by parsing, such that correlation between colour components may be removed, thereby improving a decoding efficiency.

Further, the spatial block may be also obtained at a decoder side by partitioning spatially the point cloud. Therefore, in some embodiments, for S601, the determining the spatial block in which the decoding point is located, may include following acts.

In S601-a, a point cloud is partitioned spatially to obtain at least one spatial block.

It should be noted that since a process of LOD partitioning is performed along z, y, and x directions according to Morton codes at an encoder side, inverse transform needs to be performed along the z, y, and x directions according to the Morton codes at a decoder side. Herein, the closer the distance between three colour components (such as a component Y, a component U, and a component V) is, the higher the correlation of points is. Based on this, the point cloud may be partitioned spatially, so that the at least one spatial block may be obtained.

In some embodiments, the point cloud may be partitioned into a plurality of spatial blocks according to a spatial adjacency relationship between points. Therefore, for S601-a, the partitioning spatially the point cloud to obtain the at least one spatial block may include: partitioning the point cloud into a plurality of point sets according to a spatial adjacency relationship between points in the point cloud, and determining a first degree of correlation between a first colour component and a second colour component in each of the point sets; and partitioning spatially the point cloud according to the determined first degree of correlation, to obtain the at least one spatial block.

That is to say, the point cloud may be partitioned into the plurality of point sets according to the spatial adjacency relationship between the points in the point cloud, so that the first degree of correlation between the first colour component and the second colour component in each of the point sets may be determined, and then the point cloud may be partitioned into spatial blocks with high correlation between colour components.

Specifically, the point cloud may be partitioned spatially according to a first degree of correlation between the component Y and the component U in each of the point sets, or the point cloud may be partitioned spatially according to a first degree of correlation between the component Y and the component V in each of the point sets. Since the closer the distance between the colour components is, the higher the correlation of points is, the point cloud is partitioned spatially according to the first degree of correlation between the colour components, so as to obtain at least one spatial block.

In some embodiments, the point cloud may be partitioned into a plurality of spatial blocks according to Morton codes of points in the point cloud. Therefore, for S601-a, the partitioning spatially the point cloud to obtain the at least one spatial block includes: calculating Morton codes of points in the point cloud; arranging the Morton codes of the points in the point cloud in an ascending order, and determining a maximum value of the Morton codes and a minimum value of the Morton codes; calculating a difference between the maximum value of the Morton codes and the minimum value of the Morton codes, and shifting the obtained difference to right by N bits to obtain a shifted difference, wherein N is a positive integer greater than or equal to 1; and partitioning the point cloud into a quantity, which equals to the shifted difference, of spatial blocks when the shifted difference meets a preset range.

It should be noted that the points in the point cloud may be all points in the point cloud or a portion of points in the point cloud, and these points are relatively concentrated spatially. Thus, for partitioning of the spatial blocks, Morton codes of these points may be calculated and the calculated Morton codes may be arranged in an ascending order, that is, the obtained Morton codes are arranged in an order from small to large; then, a maximum value of the Morton codes and a minimum value of the Morton codes are determined, and then a difference (which may be represented by delta) between the maximum value of the Morton codes and the minimum value of the Morton codes is calculated. By shifting delta bits to right, a shifted delta may be obtained after the delta bits are shifted to right by N bits, such that the shifted delta may meet a preset range, at this time the point cloud may be partitioned into a quantity, which equals to the shifted delta, of spatial blocks. Shifting the delta bits to right by N bits may be regarded as shifting a maximum value bit of the Morton codes to right by N bits and shifting a minimum value bit of the Morton codes to right by N bits, then a difference between the maximum value bit and the minimum value bit is calculated, and a obtained difference means that the delta bits are shifted to right by N bits.

In addition, the preset range indicates a range that needs to be met by a quantity of spatial blocks obtained by partitioning the point cloud. Here, the preset range may be 16<delta≤32 or 8<delta≤16, which is not specifically limited in the embodiments of the present application.

Further, after the Morton codes of the points in the point cloud are calculated, the method may further include: shifting the Morton codes of the points in the point cloud to right by N bits; and determining that a portion of points in the point cloud belongs to a same spatial block if values of shifted Morton codes of the portion of the points are the same.

It should be noted that the Morton codes of the points in the point cloud are shifted to right by N bits, so that if the values of the shifted Morton codes of the portion of the points are the same, the portion of the points may be determined to belong to the same spatial block, that is, points, of which values of right-shifted Morton codes are the same, may be marked as "located in a same spatial block".

In S601-b, the spatial block in which the decoding point is located is determined from the at least one spatial block based on a geometric position of the decoding point.

It should be noted that the at least one spatial block may be obtained by partitioning spatially the point cloud. Thus, the spatial block in which the decoding point is located may be determined from the at least one spatial block according to the geometric position of the decoding point, so as to facilitate constructing a prediction model according to the spatial block subsequently.

It should also be noted that a shape of the spatial block includes at least one of: a cube shape, a cuboid shape, and an irregular shape.

The spatial block may be one of cuboids into which the point cloud is partitioned in a three-dimensional space, and a size of the cuboid is a×b×c, wherein values of a, b, and c may or may not be equal. Here, when the values of a, b, and c are equal, that is, a cube is regarded as a special cuboid.

In addition, the spatial block may also be a spatial block in an irregular shape with strong correlation between colour components, such as a triangular prism or a polyhedron, which may also be used for removing correlation of attribute colours to improve a decoding efficiency.

Further, for the first model parameter and the second model parameter, inverse quantization also needs to be performed on the first model parameter and the second model parameter after the attribute bitstream is parsed. Or, model parameters (including the first model parameter and the second model parameter) of a first spatial block and values of residuals of model parameters of remaining spatial blocks may be obtained through parsing, and then the model parameters of the remaining spatial blocks may be obtained according to the values of the residuals of the model parameters.

Optionally, in some embodiments, after the attribute bitstream is parsed, the method may further include: performing inverse quantization on parsed first model parameter and second model parameter to obtain the first model parameter and the second model parameter.

It should be noted that if the first model parameter and the second model parameter are quantized at an encoder side, after the attribute bitstream is parsed at a decoder side, inverse quantization also needs to be performed on the first model parameter and the second model parameter to obtain the first model parameter and the second model parameter.

Optionally, in some embodiments, after the attribute bitstream is parsed, the method may further include: acquiring the first model parameter and the second model parameter corresponding to a first spatial block of the at least one spatial block and values of residuals of model parameters corresponding to remaining spatial blocks of the at least one spatial block; and obtaining first model parameters and second model parameters corresponding to the remaining spatial blocks according to the first model parameter and the second model parameter corresponding to the first spatial block and the values of the residuals of the model parameters.

It should be noted that the at least one spatial block includes the first spatial block and the remaining spatial blocks. For the first model parameter and the second model parameter, if model parameters (including the first model parameter and the second model parameter) of the first spatial block are first signalled in the attribute bitstream at the encoder side, model parameters of the remaining spatial blocks are modified to be values of residuals of model parameters compared with the first spatial block, and the values of the residuals are then signalled in the attribute bitstream in turn, then after the attribute bitstream is parsed at the decoder side, the model parameters (including first model parameters and second model parameters) of the remaining spatial blocks need to be determined according to parsed values of residuals of model parameters.

In the embodiment of the present application, when the spatial blocks are partitioned in the point cloud, correlation between colour channels is calculated according to a selected point set in the spatial block to obtain a second degree of correlation, i.e., correlation of a parent spatial block. When the calculated second degree of correlation is lower, for the points in the spatial block, a quantity of right-shifted bits of Morton codes is reduced by one (assuming that a quantity of right-shifted bits is N, then the quantity of the right-shifted bits is reduced by one to be N−1), at this time the spatial block may be partitioned into two sub-spatial blocks. Then, correlation between colour channels is calculated for the two sub-spatial blocks to obtain a third degree of correlation, that is, correlation of the two sub-spatial blocks. If the correlation of the two sub-spatial blocks is significantly greater than that of the parent spatial block, then the mode of partitioning the spatial block into two sub-spatial blocks may be used, that is, prediction between colour channels may be performed using the two sub-spatial blocks respectively, that is, two sub-prediction models are constructed according to the two sub-spatial blocks to predict the second colour component according to the first colour component; otherwise, if the correlation of the two sub-spatial blocks is less than or equal to that of the parent spatial block, then prediction may be performed using the parent spatial block, that is, the flow of the prediction method shown in FIG. 4 is performed.

In the embodiment of the present application, attribute prediction between colour channels is performed through correlation between the colour channels under LOD partitioning and lifting transform. At an encoder side, partitioning of spatial blocks and straight line fitting are required, and the calculated first model parameter and second model parameter are signalled in a bitstream and transmitted to a decoder. At a decoder side, only partitioning of spatial blocks is required, a value of a second colour component is then predicted according to a first model parameter and a second model parameter of a corresponding spatial block obtained by parsing and a value of a first colour component, and finally a prediction value obtained through prediction and a value of a residual obtained after parsing and LOD partitioning and lifting inverse transform are superimposed to obtain a required attribute reconstructed value. Thus, bit rates of a first colour channel (represented by Y), a second colour channel (represented by U), and a third colour channel (represented by V) of an attribute part may be decreased under a premise that performance is basically not affected.

This embodiment provides the prediction method, which is applied to a decoder. Specific implementations of the foregoing embodiments are described in detail through the embodiments described above. It may be seen that another colour component is predicted using one colour component to obtain a prediction value, so as to reconstruct an attribute value according to the prediction value and a predicted residual obtained by parsing, such that correlation between colour components may be removed, thereby improving a decoding efficiency.

Figure 8:
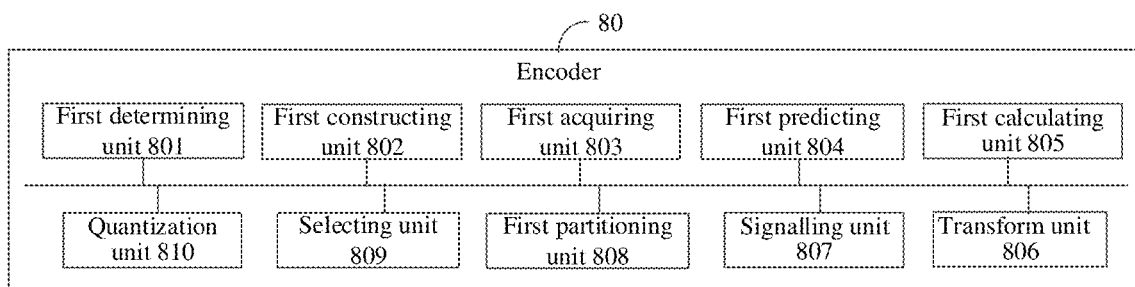
FIG. 8 is a schematic diagram of a structure of an encoder according to an embodiment of the present application.

Based on a same inventive concept as the foregoing embodiments, referring to FIG. 8, FIG. 8 shows a schematic diagram of a structure of an encoder 80 according to an embodiment of the present application. The encoder 80 may include a first determining unit 801, a first constructing unit 802, a first acquiring unit 803, a first predicting unit 804, a first calculating unit 805, and a transform unit 806, wherein the first determining unit 801 is configured to determine a spatial block in which an encoding point is located; the first constructing unit 802 is configured to construct a prediction model according to the spatial block, wherein the prediction model is used for characterizing a predicted relationship between a first colour component and a second colour component of the encoding point; the first acquiring unit 803 is configured to acquire a value of the first colour component and a value of the second colour component of the encoding point; the first predicting unit 804 is configured to obtain a prediction value of the second colour component of the encoding point using the prediction model and the value of the first colour component; the first calculating unit 805 is configured to calculate a difference between the value of the second colour component and the prediction value of the second colour component, and use the obtained difference as a residual of the encoding point; and the transform unit 806 is configured to perform LOD partitioning and lifting transform based on the residual of the encoding point.

In the above solution, referring to FIG. 8, the encoder 80 may further include a signalling unit 807 configured to encode the residual of the encoding point and signal it in an attribute bitstream.

In the above solution, referring to FIG. 8, the encoder 80 may further include a first partitioning unit 808 configured to partition spatially a point cloud to obtain at least one spatial block.

The first determining unit 801 is configured to determine a spatial block in which the encoding point is located from the at least one spatial block based on a geometric position of the encoding point.

In the above solution, the first determining unit 801 is further configured to partition the point cloud into a plurality of point sets according to a spatial adjacency relationship between points in the point cloud, and determine a first degree of correlation between a first colour component and a second colour component in each of the point sets.

The first partitioning unit 808 is configured to partition spatially the point cloud according to the determined first degree of correlation to obtain the at least one spatial block.

In the above solution, the first calculating unit 805 is further configured to calculate Morton codes of the points in the point cloud.

The first determining unit 801 is further configured to arrange the Morton codes of the points in the point cloud in an ascending order, and determine a maximum value of the Morton codes and a minimum value of the Morton codes.

The first calculating unit 805 is further configured to calculate a difference between the maximum value of the Morton codes and the minimum value of the Morton codes, and shift the obtained difference to right by N bits to obtain a shifted difference, wherein N is a positive integer greater than or equal to 1.

The first partitioning unit 808 is configured to partition the point cloud into a quantity, which equals to the shifted difference, of spatial blocks when the shifted difference meets a preset range.

In the above solution, the first determining unit 801 is further configured to shift the Morton codes of the points in the point cloud to right by N bits; and determine that a portion of points in the point cloud belongs to a same spatial block if values of shifted Morton codes of the portion of the points are the same.

In the above solution, referring to FIG. 8, the encoder 80 may further include a selecting unit 809 configured to select K points from the spatial block to combine the selected K points into a point set, wherein K is a positive integer greater than or equal to 20.

The first determining unit 801 is configured to determine model parameters based on the K points in the point set, wherein the model parameters include a first model parameter and a second model parameter.

The first constructing unit 802 is configured to construct the prediction model according to the first model parameter and the second model parameter.

In the above solution, the first acquiring unit 803 is configured to acquire a value of a first colour component and a value of a second colour component of each point in the point set.

The first calculating unit 805 is further configured to calculate the first model parameter using a first calculation sub-model according to the value of the first colour component and the value of the second colour component of each point in the point set; and calculate the second model parameter using a second calculation sub-model according to the first model parameter.

In the above solution, the signalling unit 807 is further configured to signal the first model parameter and the second model parameter in the attribute bitstream.

In the above solution, referring to FIG. 8, the encoder 80 may further include a quantization unit 810 configured to quantize the first model parameter and the second model parameter to obtain a quantized first model parameter and a quantized second model parameter.

The signalling unit 807 is further configured to signal the quantized first model parameter and the quantized second model parameter in the attribute bitstream.

In the above solution, the signalling unit 807 is further configured to signal a first model parameter and a second model parameter corresponding to a first spatial block of the at least one spatial block in the attribute bitstream; and calculate values of residuals of model parameters of remaining spatial blocks with respect to a previous spatial block in the at least one spatial block, and signal the values of the residuals of the model parameters in the attribute bitstream in turn, wherein the at least one spatial block includes the first spatial block and the remaining spatial blocks.

In the above solution, the first calculating unit 805 is further configured to, for the spatial block, calculate a second degree of correlation between a first colour component and a second colour component corresponding to the spatial block.

The first partitioning unit 808 is further configured to shift a Morton code of each point in the spatial block to right by N−1 bits to obtain two sub-spatial blocks if the second degree of correlation is less than a preset threshold of degree of correlation.

The first calculating unit 805 is further configured to calculate a third degree of correlation between a first colour component and a second colour component corresponding to the two sub-spatial blocks.

The first constructing unit 802 is further configured to construct two sub-prediction models according to the two sub-spatial blocks if the third degree of correlation is greater than the second degree of correlation.

The first predicting unit 804 is further configured to obtain a prediction value of the second colour component value of the encoding point using the two sub-prediction models and the value of the first colour component.

In the above solution, a shape of the spatial block includes at least one of: a cube shape, a cuboid shape, and an irregular shape.

It may be understood that, in this embodiment, a "unit" may be a portion of a circuit, a portion of a processor, a portion of a program or software, etc., or, of course, may be a module, or may be non-modular. In addition, various components in this embodiment may be integrated into one processing unit, or various units may exist physically separately, or two or more than two units may be integrated into one unit. The integrated unit mentioned above may be implemented in a form of hardware, or may be implemented in a form of a software functional module.

The integrated unit, if implemented in a form of a software functional module and sold or used as an independent product, may be stored in a computer-readable storage medium. Based on such understanding, the technical solution of the present application, in essence, or a part contributing to the prior art, or all or part of the technical solution, may be embodied in a form of a software product, the computer software product is stored in a storage medium, and includes several instructions for enabling a computer device (which may be a personal computer, a server, or a network device, etc.) or a processor to perform all or part of the acts of the methods according to the embodiments. The aforementioned storage medium includes various media, such as a U disk, a mobile hard disk, a Read Only Memory (ROM), a Random Access Memory (RAM), a magnetic disk, or an optical disk, which are capable of storing program codes.

Therefore, an embodiment of the present application provides a computer storage medium having stored therein a prediction program, which, when executed by a first processor, implement the method according to any one of the aforementioned embodiments.

Figure 9:
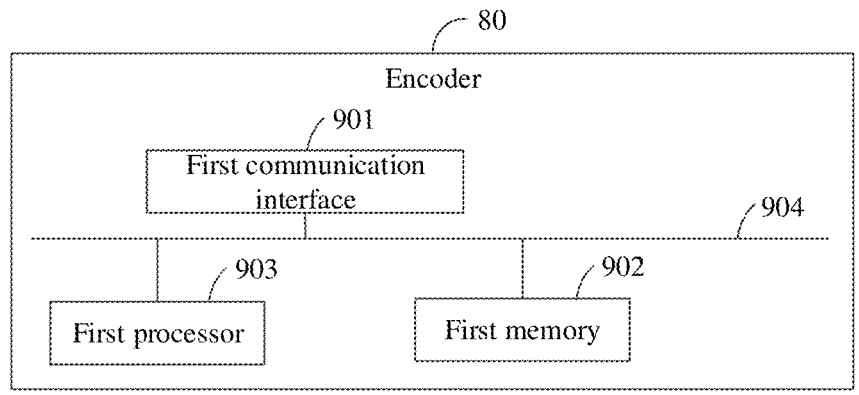
FIG. 9 is a schematic diagram of a specific hardware structure of an encoder according to an embodiment of the present application.

Based on the composition of the encoder 80 and the computer storage medium described above, referring to FIG. 9, which shows a specific hardware structure of an encoder 80 according to an embodiment of the present application. The encoder 80 may include a first communication interface 901, a first memory 902, and a first processor 903 coupled together through a first bus system 904. It may be understood that the first bus system 904 is used for implementing connection and communication between these components. In addition to including data buses, the first bus system 904 further includes power buses, control buses, and status signal buses. However, for the sake of clarity, various buses are all labeled as the first bus system 904 in FIG. 9.

The first communication interface 901 is configured to receive and send signals during reception and transmission of information from and to other external network elements.

The first memory 902 is configured to store a computer program capable of running on the first processor 903.

The first processor 903 is configured to, when the computer program is running, determine a spatial block in which an encoding point is located; construct a prediction model according to the spatial block, wherein the prediction model is used for characterizing a predicted relationship between a first colour component and a second colour component of the encoding point; acquire a value of the first colour component and a value of the second colour component of the encoding point; obtain a prediction value of the second colour component of the encoding point using the prediction model and the value of the first colour component; calculate a difference between the value of the second colour component and the prediction value of the second colour component, and use the obtained difference as a residual of the encoding point; and perform LOD partitioning and lifting transform based on the residual of the encoding point.

It may be understood that the first memory 902 in the embodiment of the present application may be a volatile memory or a non-volatile memory, or may include both a volatile memory and a non-volatile memory. The non-volatile memory may be a Read Only Memory (ROM), a Programmable Read Only Memory (PROM), an Erasable Programmable Read Only Memory (EPROM), an Electrically Erasable Programmable Read Only Memory (EEPROM), or a flash memory. The volatile memory may be a Random Access Memory (RAM), which is used as an external cache. Through exemplary but non-restrictive description, many forms of RAMs may be available, such as a Static Random Access Memory (SRAM), a Dynamic Random Access Memory (DRAM), a Synchronous Dynamic Random Access Memory (SDRAM), a Double Data Rate Synchronous Dynamic Random Access Memory (DDR SDRAM), an Enhanced Synchronous Dynamic Random Access Memory (ESDRAM), a SynchLink Dynamic Random Access Memory (SLDRAM), and a Direct Rambus Random Access Memory (DRRAM). The first memory 902 in the systems and methods described in the present application is intended to include, but not be limited to, these and any other suitable types of memories.

The first processor 903 may be an integrated circuit chip having a signal processing capability. In an implementation process, each of the acts of the foregoing methods may be completed through an integrated logic circuit of hardware in the first processor 903 or instructions in a form of software. The first processor 903 described above may be a general purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component. The processor may implement or perform various methods, acts, and logical block diagrams disclosed in the embodiments of the present application. The general purpose processor may be a microprocessor, or the processor may also be any conventional processor, or the like. The acts of the methods disclosed in the embodiments of the present application may be directly embodied to be performed by a hardware decoding processor, or may be performed by a combination of hardware and software modules in the decoding processor. The software modules may be located in a storage medium which is mature in the art, such as a Random Access Memory, a flash memory, a Read Only Memory, a Programmable Read Only Memory, or an electrically erasable programmable memory, or a register. The storage medium is located in the first memory 902, and the first processor 903 reads information in the first memory 902 and completes the acts of the foregoing methods in combination with its hardware.

It may be understood that these embodiments described in the present application may be implemented by hardware, software, firmware, middleware, microcode, or a combination thereof. For an implementation by hardware, a processing unit may be implemented in one or more Application Specific Integrated Circuits (ASICs), Digital Signal Processors (DSPs), DSP Devices (DSPDs), Programmable Logic Devices (PLDs), Field-Programmable Gate Arrays (FPGAs), general purpose processors, controllers, microcontrollers, microprocessors, other electronic modules for performing the functions described in the present application, or combinations thereof. For an implementation by software, the techniques described in the present application may be implemented through modules (e.g., processes, functions) that perform the functions described in the present application. Software codes may be stored in a memory and executed by a processor. The memory may be implemented in the processor or external to the processor.

Optionally, as another embodiment, the first processor 903 is further configured to perform the method according to any one of the aforementioned embodiments when the computer program is running.

This embodiment provides an encoder, which may include a first determining unit, a first constructing unit, a first acquiring unit, a first predicting unit, a first calculating unit, and a transform unit, wherein the first determining unit is configured to determine a spatial block in which an encoding point is located; the first constructing unit is configured to construct a prediction model according to the spatial block, wherein the prediction model is used for characterizing a predicted relationship between a first colour component and a second colour component of the encoding point; the first acquiring unit is configured to acquire a value of the first colour component and a value of the second colour component of the encoding point; the first predicting unit is configured to obtain a prediction value of the second colour component of the encoding point using the prediction model and the value of the first colour component; the first calculating unit is configured to calculate a difference between the value of the second colour component and the prediction value of the second colour component and use the obtained difference as a residual of the encoding point; and the transform unit is configured to perform LOD partitioning and lifting transform based on the residual of the encoding point. Thus, another colour component is predicted using one colour component to obtain a prediction value, so as to calculate a predicted residual according to an actual value and the prediction value, such that correlation between colour components may be removed and encoding bit overhead may be reduced effectively, thereby improving an encoding efficiency.

Based on a same inventive concept as the foregoing embodiments, referring to FIG. 10, FIG. 10 shows a schematic diagram of a structure of a decoder 100 according to an embodiment of the present application. The decoder 100 may include a second determining unit 1001, a parsing unit 1002, a second constructing unit 1003, a second predicting unit 1004, an inverse transform unit 1005, and a second calculating unit 1006, wherein the second determining unit 1001 is configured to determine a spatial block in which a decoding point is located; the parsing unit 1002 is configured to parse an attribute bitstream to obtain a value of a first colour component and an initial residual of the decoding point, and a first model parameter and a second model parameter corresponding to the spatial block; the second constructing unit 1003 is configured to construct a prediction model according to the first model parameter and the second model parameter, wherein the prediction model is used for characterizing a predicted relationship between the first colour component and a second colour component of the decoding point; the second predicting unit 1004 is configured to obtain a prediction value of the second colour component of the decoding point using the prediction model and the value of the first colour component; the inverse transform unit 1005 is configured to perform LOD partitioning and lifting inverse transform on the initial residual obtained by the parsing to determine a residual of the decoding point; and the second calculating unit 1006 is configured to calculate a reconstructed value of the second colour component of the decoding point based on the residual of the decoding point and the prediction value of the second colour component.

In the above solution, referring to FIG. 10, the encoder 100 may further include a second partitioning unit 1007 configured to partition spatially a point cloud to obtain at least one spatial block.

The second determining unit 1001 is configured to determine the spatial block in which the decoding point is located from the at least one spatial block based on a geometric position of the decoding point.

In the above solution, the second determining unit 1001 is further configured to partition the point cloud into a plurality of point sets according to a spatial adjacency relationship between points in the point cloud, and determine a first degree of correlation between a first colour component and a second colour component in each of the point sets.

The second partitioning unit 1007 is configured to partition spatially the point cloud according to the determined first degree of correlation to obtain the at least one spatial block.

In the above solution, the second calculating unit 1006 is further configured to calculate Morton codes of the points in the point cloud.

The second determining unit 1001 is further configured to arrange the Morton codes of the points in the point cloud in an ascending order, and determine a maximum value of the Morton codes and a minimum value of the Morton codes.

The second calculating unit 1006 is further configured to calculate a difference between the maximum value of the Morton codes and the minimum value of the Morton codes, and shift the obtained difference to right by N bits to obtain a shifted difference, wherein N is a positive integer greater than or equal to 1.

The second partitioning unit 1007 is configured to partition the point cloud into a quantity, which equals to the shifted difference, of spatial blocks when the shifted difference meets a preset range.

In the above solution, the second determining unit 1001 is further configured to shift the Morton codes of the points in the point cloud to right by N bits; and determine that a portion of points in the point cloud belongs to a same spatial block if values of shifted Morton codes of the portion of the points are the same.

In the above solution, referring to FIG. 10, the encoder 100 may further include an inverse quantization unit 1008 configured to perform inverse quantization on the first model parameter and second model parameter obtained by the parsing to obtain the first model parameter and the second model parameter.

In the above solution, the parsing unit 1002 is further configured to acquire a first model parameter and a second model parameter corresponding to a first spatial block in the at least one spatial block and values of residuals of model parameters corresponding to remaining spatial blocks in the at least one spatial block; and obtain first model parameters and second model parameters corresponding to the remaining spatial blocks according to the first model parameter and the second model parameter corresponding to the first spatial block and the values of the residuals of the model parameters.

In the above solution, a shape of the spatial block includes at least one of: a cube shape, a cuboid shape, and an irregular shape.

It may be understood that, in embodiments of the present application, in this embodiment, a "unit" may be a portion of a circuit, a portion of a processor, a portion of a program or software, etc., or, of course, may be a module, or may be non-modular. In addition, various components in this embodiment may be integrated into one processing unit, or various units may exist physically separately, or two or more than two units may be integrated into one unit. The integrated unit mentioned above may be implemented in a form of hardware, or may be implemented in a form of a software functional module.

The integrated unit, if implemented in a form of a software functional module and sold or used as an independent product, may be stored in a computer-readable storage medium. Based on such understanding, an embodiment of the present application provides a computer storage medium having stored therein a prediction program, which, when executed by a second processor, implement the method according to any one of the aforementioned embodiments.

Figure 11:
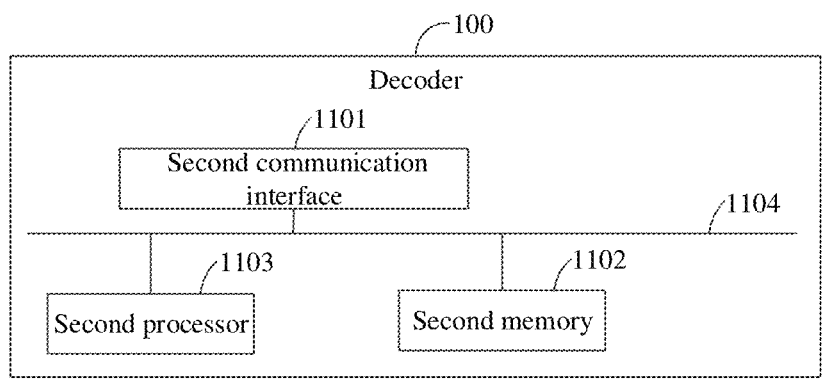
FIG. 11 is a schematic diagram of a specific hardware structure of a decoder according to an embodiment of the present application.

Based on the composition of the decoder 100 and the computer storage medium described above, referring to FIG. 11, which shows a specific hardware structure of a decoder 100 according to an embodiment of the present application. The decoder 100 may include a second communication interface 1101, a second memory 1102, and a second processor 1103 coupled together through a second bus system 1104. It may be understood that the second bus system 1104 is used for implementing connection and communication between these components. In addition to including data buses, the second bus system 1104 further includes power buses, control buses, and status signal buses. However, for the sake of clarity, various buses are all labeled as the second bus system 1104 in FIG. 11.

The second communication interface 1101 is configured to receive and send signals during reception and transmission of information from and to other external network elements.

The second memory 1102 is configured to store a computer program capable of running on the second processor 1103.

The second processor 1103 is configured to, when the computer program is running, determine a spatial block in which a decoding point is located; parse an attribute bitstream to obtain a value of a first colour component and an initial residual of the decoding point, and a first model parameter and a second model parameter corresponding to the spatial block; construct a prediction model according to the first model parameter and the second model parameter, wherein the prediction model is used for characterizing a predicted relationship between the first colour component and a second colour component of the decoding point; obtain a prediction value of the second colour component of the decoding point using the prediction model and the value of the first colour component; perform LOD partitioning and lifting inverse transform on the initial residual obtained by the parsing to determine a residual of the decoding point; and calculate a reconstructed value of the second colour component of the decoding point based on the residual of the decoding point and the prediction value of the second colour component.

Optionally, as another embodiment, the second processor 1103 is further configured to perform the method according to any one of the aforementioned embodiments when the computer program is running.

It may be understood that hardware functions of the second memory 1102 are similar to those of the first memory 902 and hardware functions of the second processor 1103 are similar to those of the first processor 903, which will not be repeated here.

An embodiment of the present application provides a decoder including a second determining unit, a parsing unit, a second constructing unit, a second predicting unit, an inverse transform unit, and a second calculating unit, wherein the second determining unit is configured to determine a spatial block in which a decoding point is located; the parsing unit is configured to parse an attribute bitstream to obtain a value of a first colour component and an initial residual of the decoding point, and a first model parameter and a second model parameter corresponding to the spatial block; the second constructing unit is configured to construct a prediction model according to the first model parameter and the second model parameter, wherein the prediction model is used for characterizing a predicted relationship between the first colour component and a second colour component of the decoding point; the second predicting unit is configured to obtain a prediction value of the second colour component of the decoding point using the prediction model and the value of the first colour component; the inverse transform unit is configured to perform LOD partitioning and lifting inverse transform on the initial residual obtained by the parsing to determine a residual of the decoding point; and the second calculating unit is configured to calculate a reconstructed value of the second colour component of the decoding point based on the residual of the decoding point and the prediction value of the second colour component. Thus, another colour component is predicted using one colour component to obtain a prediction value, so as to reconstruct an attribute value according to the prediction value and a predicted residual obtained by parsing, such that correlation between colour components may be removed and encoding bit overhead may be reduced effectively, thereby improving an encoding and decoding efficiency.

It should be noted that in the present application, the terms "include", "contain" or any other variations thereof are intended to cover a non-exclusive inclusion, such that a process, method, article, or apparatus that includes a series of elements includes not only those elements but also other elements not expressly listed, or further includes elements inherent to such a process, method, article, or apparatus. An element defined by a statement "include one" does not exclude presence of additional identical elements in the process, method, article or system that includes the element, without more limitations.

The above-mentioned serial numbers of the embodiments of the present application are only for description, and do not represent superiority and inferiority of the embodiments.

The methods disclosed in several method embodiments provided in the present application may be arbitrarily combined without conflict, to obtain new method embodiments. Features disclosed in several product embodiments provided in the present application may be arbitrarily combined without conflict, to obtain new product embodiments. Features disclosed in several method or device embodiments provided in the present application may be arbitrarily combined without conflict, to obtain new method embodiments or device embodiments.

The foregoing are merely specific implementations of the present application, but the protection scope of the present application is not limited thereto. Any variation or substitution that may easily occur to a person skilled in the art within the technical scope disclosed by the present application shall be included within the protection scope of the present application. Therefore, the protection scope of the present application shall be subject to the protection scope of the claims.

INDUSTRIAL APPLICABILITY

In the embodiments of the present application, the method is applied to an encoder. By determining a spatial block in which an encoding point is located; constructing a prediction model according to the spatial block, wherein the prediction model is used for characterizing a predicted relationship between a first colour component and a second colour component of the encoding point; then acquiring a value of the first colour component and a value of the second colour component of the encoding point; obtaining a prediction value of the second colour component of the encoding point using the prediction model and the value of the first colour component; finally calculating a difference between the value of the second colour component and the prediction value of the second colour component, and using the obtained difference as a residual of the encoding point; and performing Level of Detail (LOD) partitioning and lifting transform based on the residual of the encoding point, thus another colour component may be predicted using one colour component to obtain a prediction value, so as to calculate a predicted residual according to an actual value and the prediction value, such that correlation between colour components may be removed and encoding bit overhead may be reduced effectively, thereby improving an encoding efficiency. The method may also be applied to a decoder. By determining a spatial block in which a decoding point is located; parsing an attribute bitstream to obtain a value of a first colour component and an initial residual of the decoding point, and a first model parameter and a second model parameter corresponding to the spatial block; constructing a prediction model according to the first model parameter and the second model parameter, wherein the prediction model is used for characterizing a predicted relationship between the first colour component and a second colour component of the decoding point; then obtaining a prediction value of the second colour component of the decoding point using the prediction model and the value of the first colour component; finally performing LOD partitioning and lifting inverse transform on the initial residual obtained by the parsing to determine a residual of the decoding point; and calculating a reconstructed value of the second colour component of the decoding point based on the residual of the decoding point and the prediction value of the second colour component, thus another colour component may be predicted using one colour component to obtain a prediction value, so as to reconstruct an attribute value according to the prediction value and a predicted residual obtained by parsing, such that correlation between colour components prior to the LOD partitioning and lifting transform may be removed and encoding bit overhead may be reduced effectively, thereby improving an encoding and decoding efficiency.

The invention claimed is:

1. A prediction method, which is applied to an encoder and comprises:
 determining a spatial block in which an encoding point is located;
 constructing a prediction model according to the spatial block, wherein the prediction model is used for characterizing a predicted relationship between a first colour component and a second colour component of the encoding point;
 acquiring a value of the first colour component and a value of the second colour component of the encoding point;
 obtaining a prediction value of the second colour component of the encoding point by using the prediction model and the value of the first colour component;
 calculating a difference between the value of the second colour component and the prediction value of the second colour component, and using the obtained difference as a residual of the encoding point; and
 performing Level of Detail (LOD) partitioning and lifting transform based on the residual of the encoding point.

2. The method according to claim 1, wherein after the LOD partitioning and lifting transform are performed based on the residual of the encoding point, the method further comprises:
 encoding the residual of the encoding point and signalling the encoded residual in an attribute bitstream.

3. The method according to claim 1, wherein the determining the spatial block in which the encoding point is located comprises:
 partitioning spatially a point cloud to obtain at least one spatial block; and
 determine the spatial block in which the encoding point is located from the at least one spatial block based on a geometric position of the encoding point.

4. The method according to claim 3, wherein the partitioning spatially the point cloud to obtain the at least one spatial block comprises:
 partitioning the point cloud into a plurality of point sets according to a spatial adjacency relationship between points in the point cloud, and determining a first degree of correlation between the first colour component and the second colour component in each of the point sets; and
 partitioning spatially the point cloud according to the determined first degree of correlation to obtain the at least one spatial block.

5. The method according to claim 3, wherein the partitioning spatially the point cloud to obtain the at least one spatial block comprises:
 calculating Morton codes of points in the point cloud;
 arranging the Morton codes of the points in the point cloud in an ascending order, and determining a maximum value of the Morton codes and a minimum value of the Morton codes;
 calculating a difference between the maximum value of the Morton codes and the minimum value of the Morton codes, and shifting the obtained difference to right by N bits to obtain a shifted difference, wherein N is a positive integer greater than or equal to 1; and
 partitioning the point cloud into a quantity, which equals to the shifted difference, of spatial blocks when the shifted difference meets a preset range.

6. The method according to claim 5, wherein after the Morton codes of the points in the point cloud are calculated, the method further comprises:
 shifting the Morton codes of the points in the point cloud to the right by N bits; and
 determining that a portion of the points in the point cloud belongs to a same spatial block if values of shifted Morton codes of the portion of the points are the same.

7. The method according to claim 1, wherein the constructing the prediction model according to the spatial block comprises:
 selecting K points from the spatial block to combine the selected K points into a point set, wherein K is a positive integer greater than or equal to 20;
 determining model parameters based on the K points in the point set, wherein the model parameters comprise a first model parameter and a second model parameter; and
 constructing the prediction model according to the first model parameter and the second model parameter.

8. The method according to claim 7, wherein the determining the model parameters based on the K points in the point set comprises:
 acquiring a value of the first colour component and a value of the second colour component of each point in the point set;
 calculating the first model parameter by using a first calculation sub-model according to the value of the first colour component and the value of the second colour component of each point in the point set; and
 calculating the second model parameter by using a second calculation sub-model according to the first model parameter.

9. The method according to claim 7, wherein after the Level of Detail (LOD) partitioning and lifting transform are performed based on the residual of the encoding point, the method further comprises:
 signalling the first model parameter and the second model parameter in an attribute bitstream;
 wherein the signalling the first model parameter and the second model parameter in the attribute bitstream comprises:
 quantizing the first model parameter and the second model parameter to obtain a quantized first model parameter and a quantized second model parameter; and
 signalling the quantized first model parameter and the quantized second model parameter in the attribute bitstream;
 or, wherein the signalling the first model parameter and the second model parameter in the attribute bitstream comprises:
 signalling the first model parameter and the second model parameter corresponding to a first spatial block of the at least one spatial block in the attribute bitstream; and calculating values of residuals of model parameters of remaining spatial blocks with respect to a previous spatial block in the at least one spatial block, and signalling the values of the residuals of the model parameters in the attribute bitstream in turn, wherein the at least one spatial block comprises the first spatial block and the remaining spatial blocks.

10. The method according to claim 1, further comprising:
calculating a second degree of correlation between the first colour component and the second colour component corresponding to the spatial block for the spatial block;
shifting a Morton code of each point in the spatial block to right by N−1 bits to obtain two sub-spatial blocks if the second degree of correlation is less than a preset threshold of degree of correlation;
calculating a third degree of correlation between the first colour component and the second colour component corresponding to the two sub-spatial blocks;
constructing two sub-prediction models according to the two sub-spatial blocks if the third degree of correlation is greater than the second degree of correlation; and
obtaining the prediction value of the second colour component value of the encoding point by using the two sub-prediction models and the value of the first colour component.

11. A prediction method, which is applied to a decoder and comprises:
determining a spatial block in which a decoding point is located;
parsing an attribute bitstream to obtain a value of a first colour component and an initial residual of the decoding point, and a first model parameter and a second model parameter corresponding to the spatial block;
constructing a prediction model according to the first model parameter and the second model parameter, wherein the prediction model is used for characterizing a predicted relationship between the first colour component and a second colour component of the decoding point;
obtaining a prediction value of the second colour component of the decoding point by using the prediction model and the value of the first colour component;
performing Level of Detail (LOD) partitioning and lifting inverse transform on the initial residual obtained by the parsing to determine a residual of the decoding point; and
calculating a reconstructed value of the second colour component of the decoding point based on the residual of the decoding point and the prediction value of the second colour component.

12. The method according to claim 11, wherein the determining the spatial block in which the decoding point is located comprises:
partitioning spatially a point cloud to obtain at least one spatial block; and
determining the spatial block in which the decoding point is located from the at least one spatial block based on a geometric position of the decoding point.

13. The method according to claim 12, wherein the partitioning spatially the point cloud to obtain the at least one spatial block comprises:
partitioning the point cloud into a plurality of point sets according to a spatial adjacency relationship between points in the point cloud, and determining a first degree of correlation between the first colour component and the second colour component in each of the point sets; and
partitioning spatially the point cloud according to the determined first degree of correlation to obtain the at least one spatial block.

14. The method according to claim 12, wherein the partitioning spatially the point cloud to obtain the at least one spatial block comprises:
calculating Morton codes of points in the point cloud;
arranging the Morton codes of the points in the point cloud in an ascending order, and determining a maximum value of the Morton codes and a minimum value of the Morton codes;
calculating a difference between the maximum value of the Morton codes and the minimum value of the Morton codes, and shifting the obtained difference to right by N bits to obtain a shifted difference, wherein N is a positive integer greater than or equal to 1; and
partitioning the point cloud into a quantity, which equals to the shifted difference, of spatial blocks when the shifted difference meets a preset range.

15. The method according to claim 14, wherein after calculating the Morton codes of the points in the point cloud, the method further comprises:
shifting the Morton codes of the points in the point cloud to right by N bits; and
determining that a portion of points in the point cloud belongs to a same spatial block if values of shifted Morton codes of the portion of the points are the same.

16. The method according to claim 11, wherein after parsing the attribute bitstream, the method further comprises:
performing inverse quantization on the first model parameter and second model parameter obtained by the parsing to obtain the first model parameter and the second model parameter.

17. The method according to claim 11, wherein after parsing the attribute bitstream, the method further comprises:
acquiring a first model parameter and a second model parameter corresponding to a first spatial block in the at least one spatial block and values of residuals of model parameters corresponding to remaining spatial blocks in the at least one spatial block; and
obtaining first model parameters and second model parameters corresponding to the remaining spatial blocks according to the first model parameter and the second model parameter corresponding to the first spatial block and the values of the residuals of the model parameters.

18. The method according to claim 11, wherein a shape of the spatial block comprises at least one of: a cube shape, a cuboid shape, and an irregular shape.

19. An encoder comprising a first memory and a first processor, wherein
the first memory is configured to store a computer program executable by the first processor; and
the first processor is configured to perform the method according to claim 1 when executing the computer program.

20. A decoder comprising a second memory and a second processor, wherein
the second memory is configured to store a computer program executable by the second processor; and the second processor is configured to perform the method according to claim 11 when executing the computer program.

\* \* \* \* \*